(12) United States Patent
Long et al.

(10) Patent No.: US 10,343,610 B2
(45) Date of Patent: Jul. 9, 2019

(54) COMPACT POWER RUNNING BOARD

(71) Applicant: Magna International Inc., Aurora (CA)

(72) Inventors: Albert Yuguang Long, Windsor (CA); Jeffrey R. Johnson, Ferndale, MI (US); Bradley E. Watson, Barrie (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 15/707,576

(22) Filed: Sep. 18, 2017

(65) Prior Publication Data

US 2018/0001825 A1  Jan. 4, 2018

Related U.S. Application Data

(63) Continuation-in-part of application No. 15/481,637, filed on Apr. 7, 2017, which is a continuation of
(Continued)

(51) Int. Cl.
*B60R 3/02* (2006.01)
*B60R 3/00* (2006.01)
*B61D 23/02* (2006.01)

(52) U.S. Cl.
CPC ............... *B60R 3/02* (2013.01); *B60R 3/002* (2013.01); *B61D 23/02* (2013.01)

(58) Field of Classification Search
CPC .. B60R 3/02; B60R 3/00; B60R 3/002; B61D 23/02
See application file for complete search history.

(56) References Cited

U.S. PATENT DOCUMENTS 3,758,134 A * 9/1973 Stewart ............... B60R 3/02
280/163
3,762,742 A * 10/1973 Bucklen ............... B60R 3/02
280/166
(Continued)

FOREIGN PATENT DOCUMENTS

| CA | 2362976 C | 4/2008 |
| CN | 103158623 A | 6/2013 |
| CN | 203601134 U | 5/2014 |

OTHER PUBLICATIONS

International Search Report for International Application No. PCT/IB2018/057194, dated Dec. 13, 2018.

*Primary Examiner* — James A Shriver, II
*Assistant Examiner* — Steve Clemmons
(74) *Attorney, Agent, or Firm* — Warn Partners, P.C.

(57) ABSTRACT

A compact deployable/retractable running board assembly for a motor vehicle including a running board, linkage coupled to the running board, and a motor assembly coupled to an actuator, the running board moveable between at least one stowed position and at least one deployed position. The linkage includes a drive arm connected to a pivot shaft within a housing at a location on the pivot shaft between two bushings that are coupled to the pivot shaft within the housing. The linkage also includes an idler arm connected to a pivot shaft within an idler housing. The actuator is operably coupled to the linkage to cause rotation of the linkage to move the running board between the at least one stowed position generally under the motor vehicle and at least one deployed position to provide a step surface for a user.

23 Claims, 25 Drawing Sheets

Related U.S. Application Data application No. 14/807,070, filed on Jul. 23, 2015, now Pat. No. 9,649,983.

(60) Provisional application No. 62/028,006, filed on Jul. 23, 2014.

(56) References Cited

U.S. PATENT DOCUMENTS

| | | | | |
|---|---|---|---|---|
| 4,231,583 | A * | 11/1980 | Learn | B60R 3/02 105/445 |
| 5,842,709 | A * | 12/1998 | Maccabee | B60R 3/02 280/166 |
| 6,149,172 | A * | 11/2000 | Pascoe | B60R 3/02 280/163 |
| 6,325,397 | B1 | 12/2001 | Pascoe et al. | |
| 6,769,527 | B1 | 8/2004 | Paris | |
| 7,513,520 | B2 * | 4/2009 | Okuyama | B60R 3/02 280/166 |
| 8,240,222 | B2 | 8/2012 | Yoshioka et al. | |
| 8,342,551 | B2 * | 1/2013 | Watson | B60R 3/02 280/163 |
| 8,833,781 | B2 * | 9/2014 | Hayes | B60R 3/02 280/163 |
| 9,272,667 | B2 * | 3/2016 | Smith | B60R 3/02 |
| 2003/0132595 | A1 | 7/2003 | Fabiano et al. | |
| 2005/0151340 | A1 | 7/2005 | Leitner | |
| 2006/0254376 | A1 * | 11/2006 | Ota | F16H 1/16 74/425 |
| 2008/0271936 | A1 * | 11/2008 | Kuntze | B60R 3/002 180/90.6 |
| 2012/0104719 | A1 | 5/2012 | Hayes | |

\* cited by examiner

COMPACT POWER RUNNING BOARD

CROSS-REFERENCE TO RELATED APPLICATIONS

This application is a continuation-in-part of U.S. patent application Ser. No. 15/481,637, filed Apr. 7, 2017, which is a continuation of U.S. patent application Ser. No. 14/807,070, filed Jul. 23, 2015, issued as U.S. Pat. No. 9,649,983, which claims the benefit of U.S. Provisional Application No. 62/028,006, filed Jul. 23, 2014. The disclosures of the above applications are incorporated herein by reference.

FIELD OF THE INVENTION

The present invention relates to a compact structure for use in a power running board system for automotive applications.

BACKGROUND OF THE INVENTION

Known power running boards have a large, high package size suitable for larger vehicles such as pickup trucks. These boards are generally moveable to gain access to passenger cabs and/or a cargo bed box. Parallel swing arms are typically connected on the outside of respective housings to pivot shaft ends, which increases the overall height of the assembly. To avoid high internal forces and stresses, this cantilever structure also requires a larger housing, which increases the weight of the assembly.

Accordingly, there exists a need for a compact and lighter weight running board assembly for a motor vehicle. More particularly, there exists a need for a lighter compact running board assembly adaptable for use on smaller motor vehicles, such as sport utility vehicles (SUVs), that includes a running board movable between at least one stowed position and at least one deployed position.

SUMMARY OF THE INVENTION

The present invention is directed to a compact running board assembly for a motor vehicle. The assembly is provided with a low height profile, which makes the assembly particularly adapted for motor vehicles with less ground clearance than conventional pickup trucks, such as sport utility vehicle and etc.

The running board assembly includes a housing assembly, an actuator assembly, which is preferably a rotary actuator assembly disposed within the housing assembly, a linkage, a mounting bracket adapted for attachment of the running board assembly to the motor vehicle, a running board coupled to the linkage and movable relative to the mounting bracket between at least one stowed position generally located underneath the motor vehicle and at least one deployed position, e.g., motor vehicle compartment entry position, a motor assembly operably coupled to the actuator for driving movement of the linkage and therefore the running board, and an electronic control unit electronically connected to the motor assembly and programmed to selectively supply voltage to said motor assembly and to turn off said motor assembly when said running board reaches said at least one stowed or at least one deployed positions.

A pivot shaft is located within a housing, and the linkage includes a drive arm connected to the pivot shaft within the housing at a predetermined location on the pivot shaft between two bushings that are coupled to the pivot shaft within the housing. The bushings are spaced an operable predetermined distance apart from each other and with the swing arm at a predetermined location therebetween, which provides an improved balanced force condition since the bushing and housing reaction forces are significantly reduced. Another pivot shaft is located within another housing, and the linkage also includes an idler arm connected to the pivot shaft within that housing. Two bushings are also coupled to the pivot shaft within the housing with the idler arm coupled therebetween on the pivot shaft. The actuator is operably coupled to the linkage to cause rotation of the linkage to move the running board between the at least one stowed position and at least one deployed position. The attachment locations of the drive arm and idler arm within the respective housings between the at least two bushings, respectively, provides a compact, reduced height package for smaller clearance vehicles. The arrangement also allows for a smaller housing to significantly reduce the weight of the compact running board assembly.

According to another aspect of the invention, a running board assembly is provided for a motor vehicle having a passenger cab and a box. The running board assembly includes a housing assembly, a linear actuator assembly partly disposed within the housing assembly, a running board operably coupled to the linear actuator assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box, and a motor operably coupled to the linear actuator assembly for driving the linear actuator assembly in opposing first and second directions to move the running board between the stowed position, the cab entry position, and the box side step position. The linear actuator assembly converts rotary input to linear motion.

According to another aspect of the invention, a running board assembly for a motor vehicle having a passenger cab and a box includes a housing assembly, a linear actuator assembly partly disposed within the housing assembly, and a running board operably coupled to the linear actuator assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box. The running board assembly also includes a drive arm fixedly secured to the running board and operably coupled to the linear actuator assembly. The drive arm further includes at least a first and second link for moving the drive arm as the linear actuator assembly is actuated. The running board assembly further includes a motor operably coupled to the linear actuator assembly for driving the drive arm to pivotally move the running board between the stowed position, the cab entry position, and the box step side position, and an electronic control unit operably coupled to the motor and programmed to turn off the motor after a predetermined number of armature revolutions to stop the running board in the cab entry position.

In accordance with another embodiment, the drive arm also includes a first stop engageable with the running board to stop the running board in the stowed position and a second stop engageable with the running board to stop the running board in the box step side position.

According to yet another aspect of the invention, a running board assembly for a motor vehicle includes a mounting bracket adapted for attachment to the motor vehicle, a running board movable relative to the mounting bracket between a stowed position tucked underneath the motor vehicle, a cab entry position disposed generally outwardly from the motor vehicle, and a box side step position disposed generally outwardly from the motor vehicle and generally rearward to the cab entry position, a motor operably coupled to the running board for driving movement thereof, and an electronic control unit electronically connected to the motor and programmed to turn off said motor when said running board reaches said cab entry position. The running board assembly also includes a housing assembly including a worm member operably coupled to the motor. The housing assembly includes a zero backlash worm self locking member, to eliminate backlash of the running board when the running board is in the cab entry position, having a worm gear fixedly mounted on an end of a ball screw and a ball nut mounted along the ball screw for movement relative thereto.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
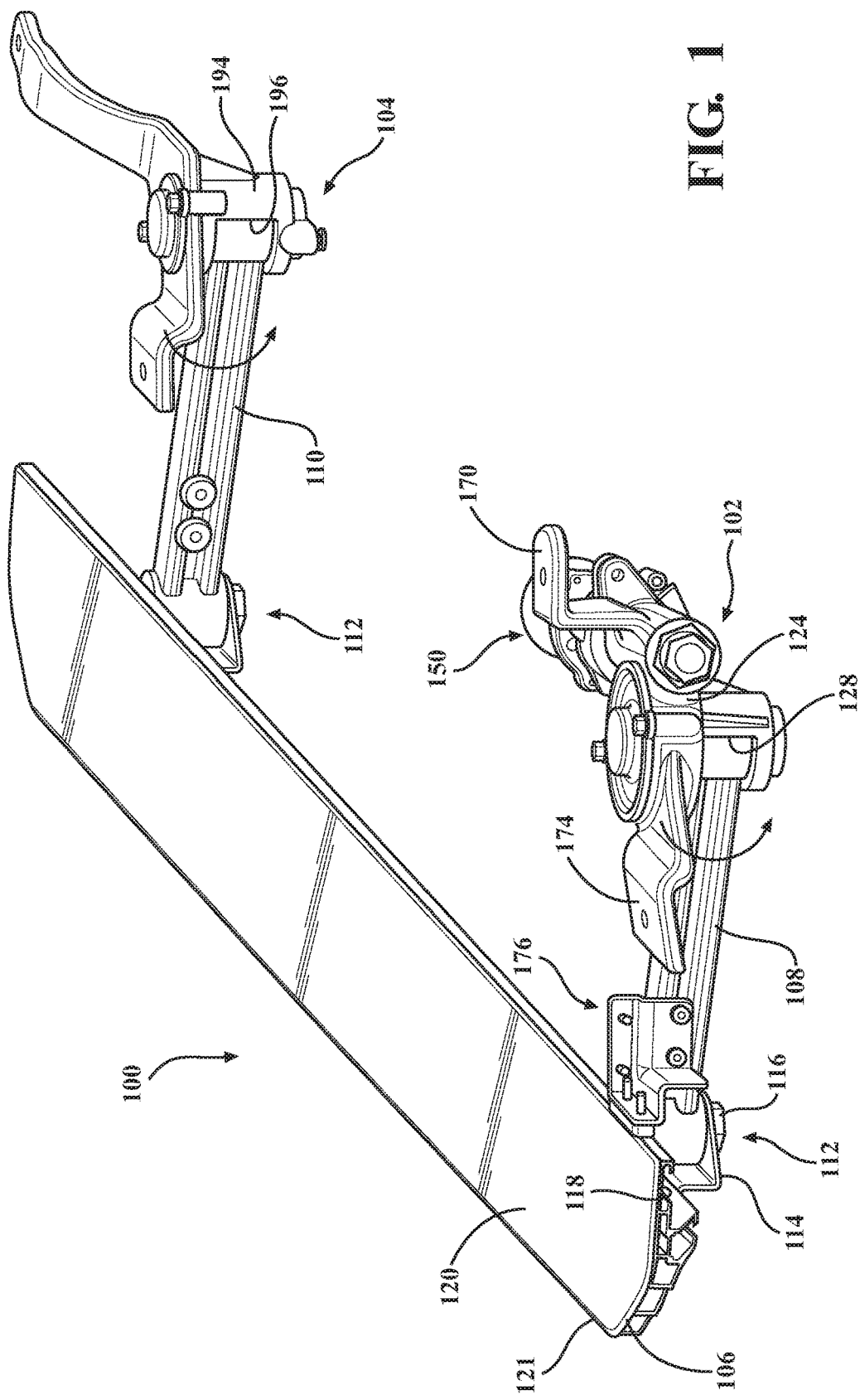
FIG. 1 is a perspective view of a compact power running board assembly, depicted in a deployed position, according to an embodiment of the present invention.
Figure 2:
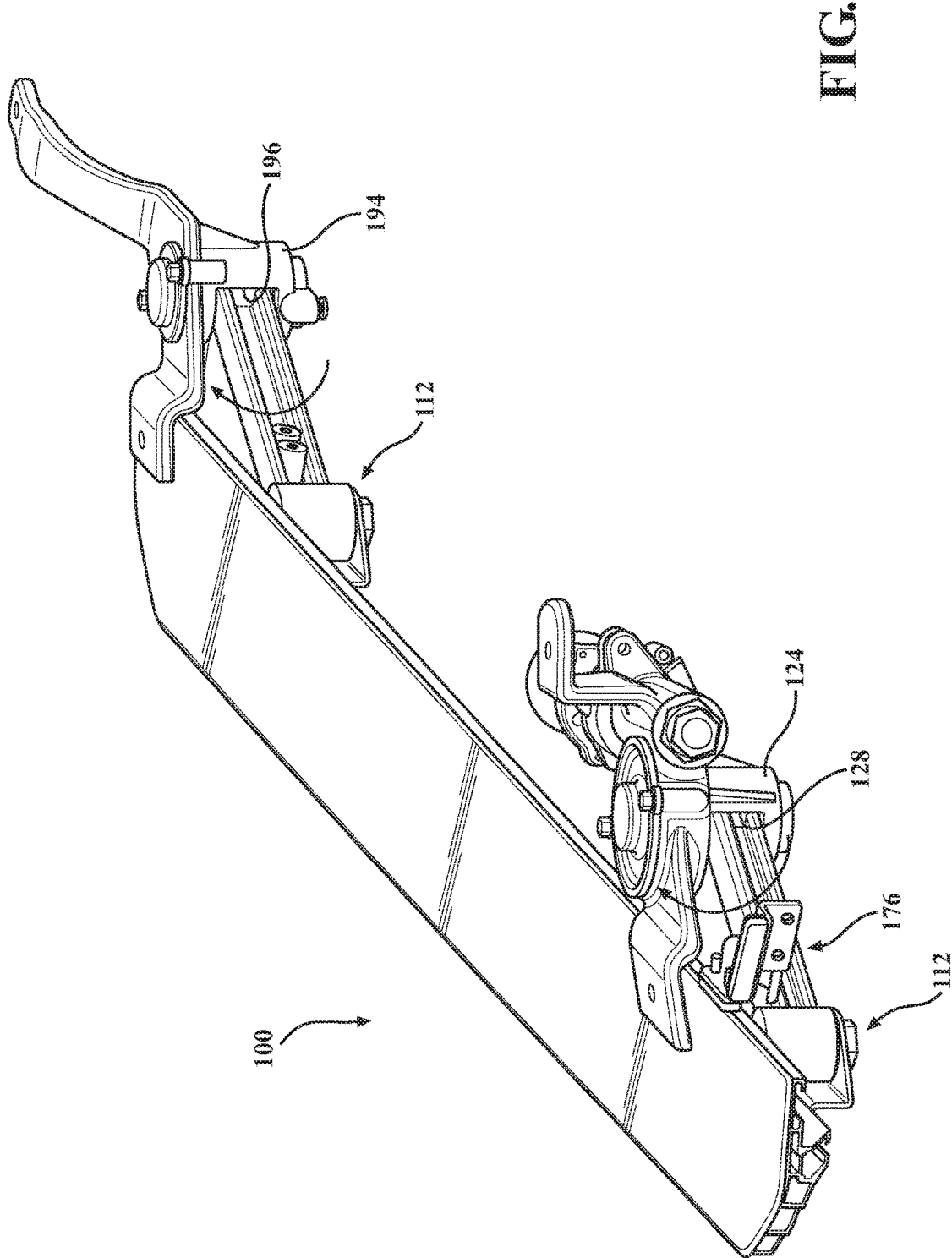
FIG. 2 is a perspective view of the compact power running board assembly of FIG. 1, depicted in a stowed position.
Figure 3:
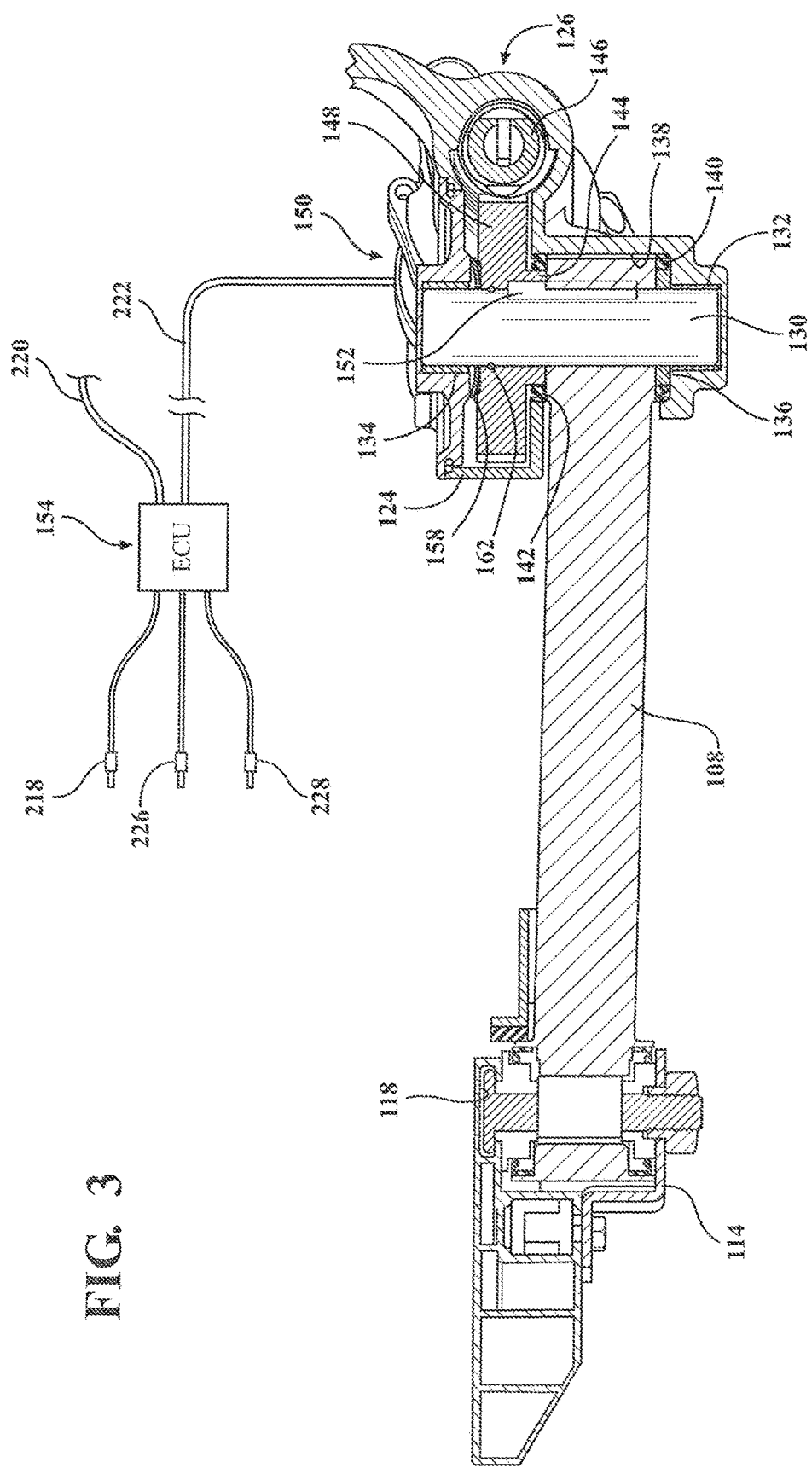
FIG. 3 is a cross sectional view of a drive arm swing mechanism of the compact power running board assembly including a rotary actuator, and coupled to the running board and to an electronic control unit.
Figure 4:
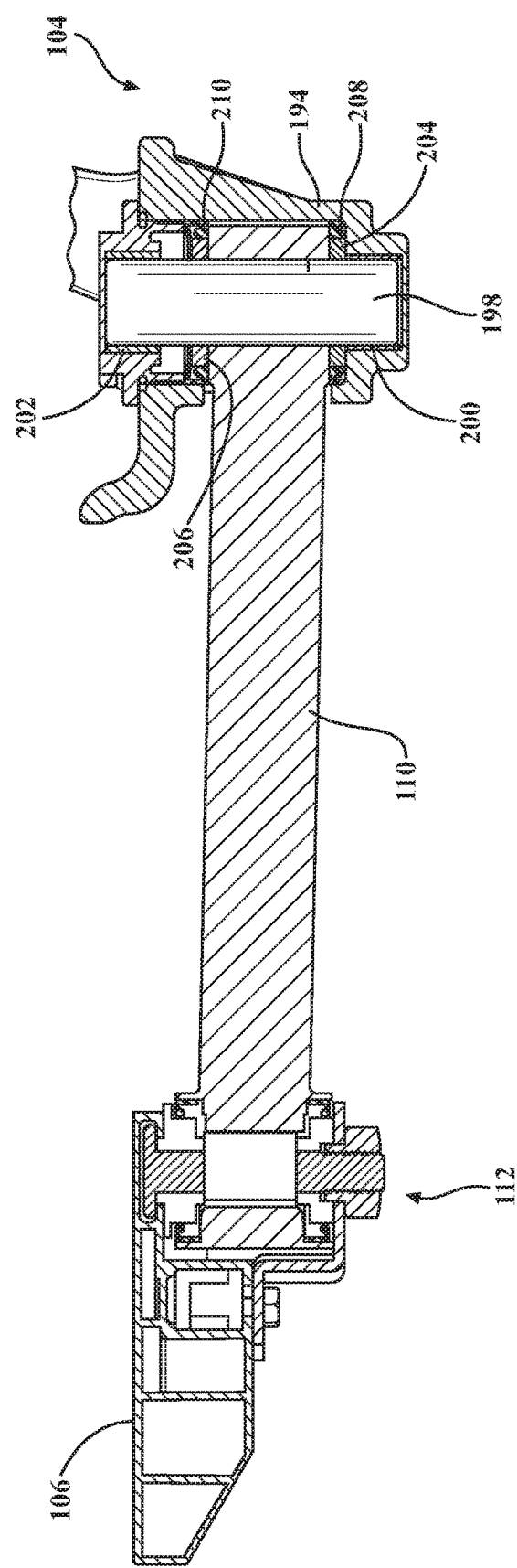
FIG. 4 is a cross sectional view of an idler arm of the compact power running board assembly coupled to the running board and to a pivot shaft within a housing.
Figure 5:
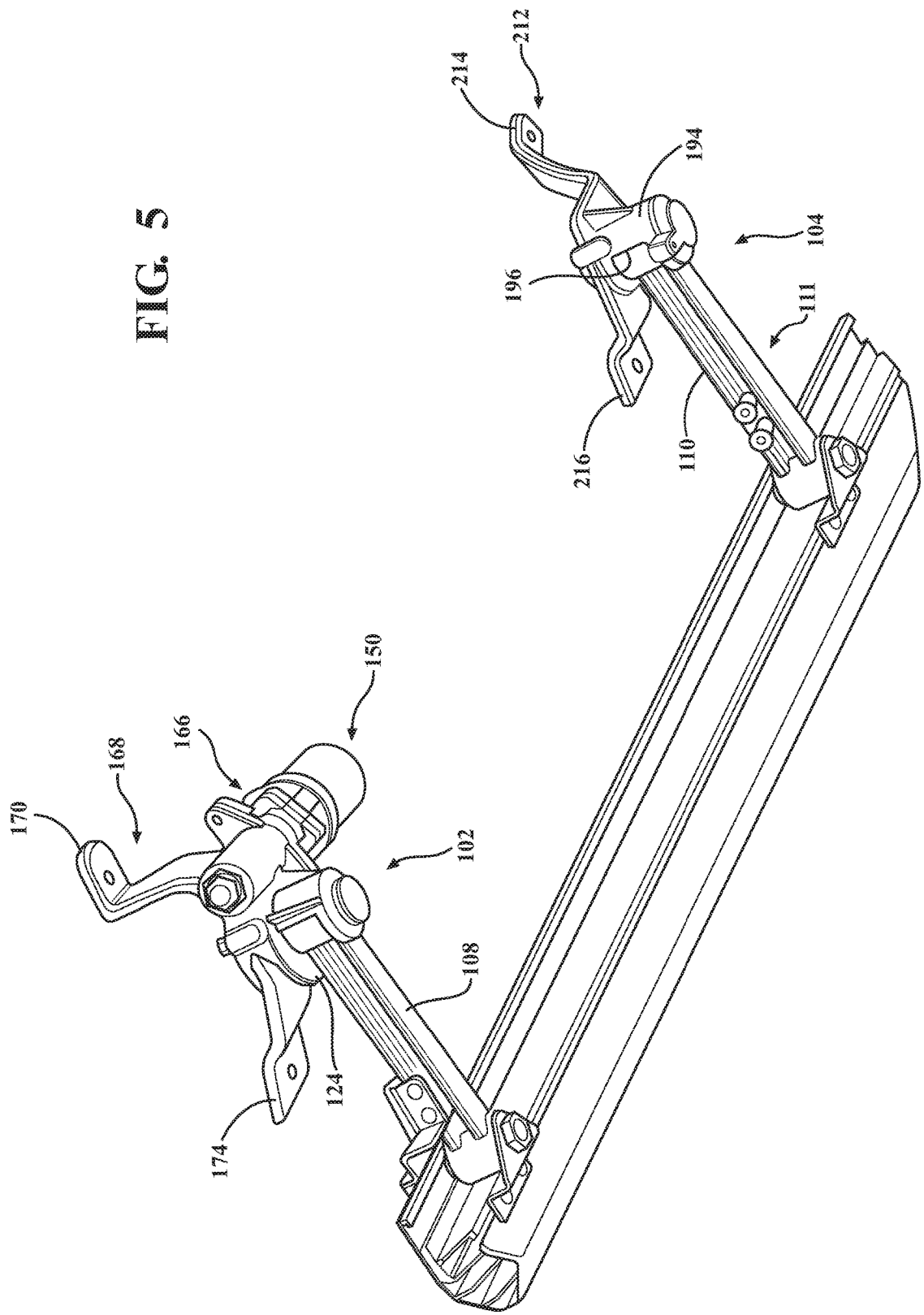
FIG. 5 is a bottom perspective view of the compact power running board of FIG. 1.
Figure 6:
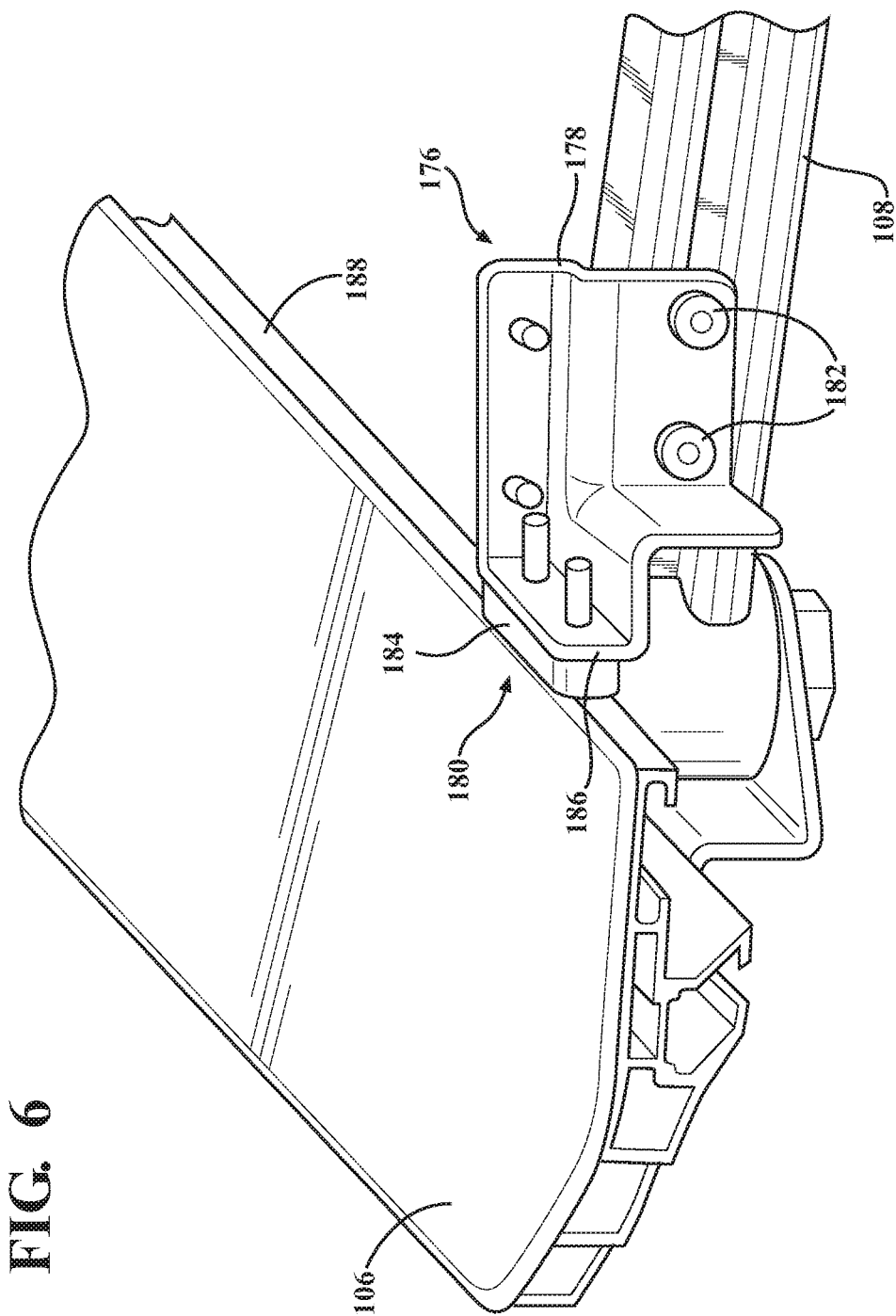
FIG. 6 is an enlarged perspective view of a mechanical stop against the running board in a deployed position.
Figure 7:
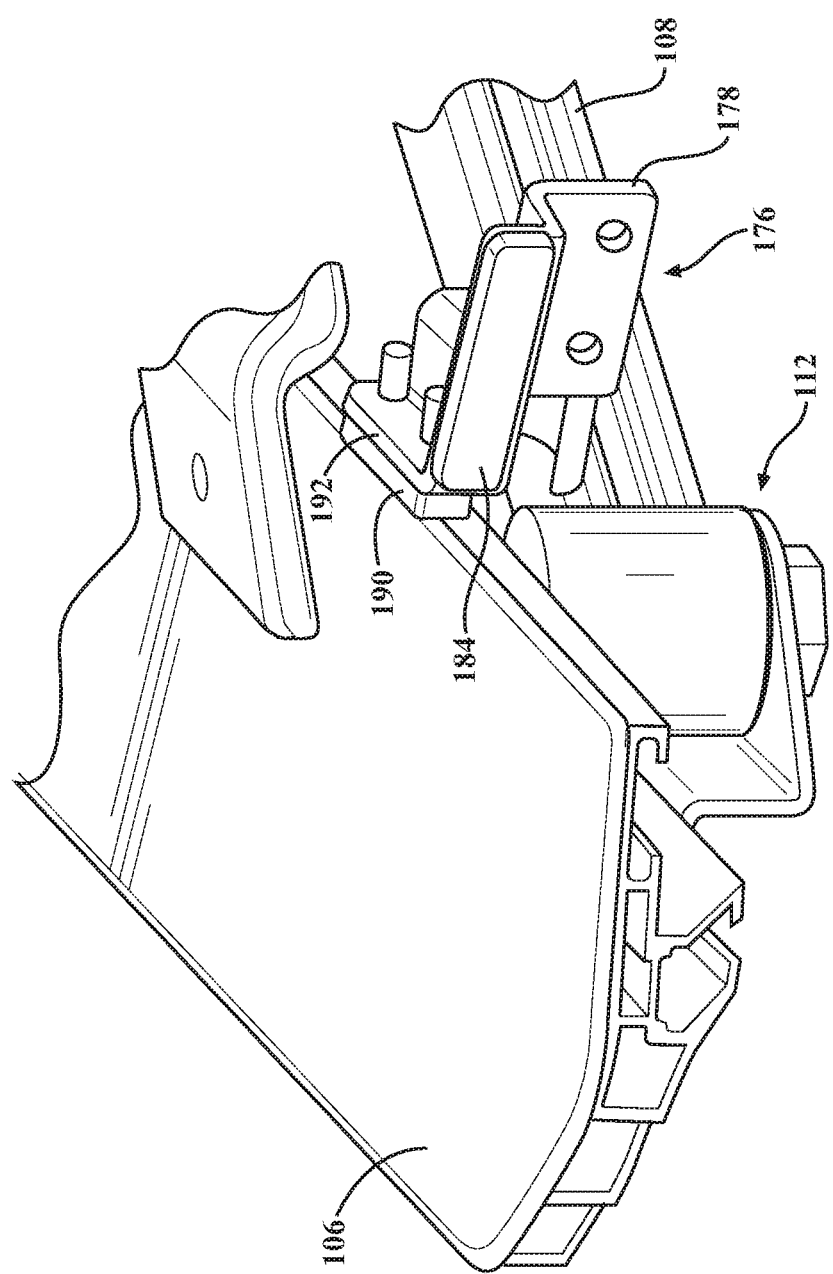
FIG. 7 is an enlarged perspective view of a mechanical stop against the running board in a stowed position.
Figure 8:
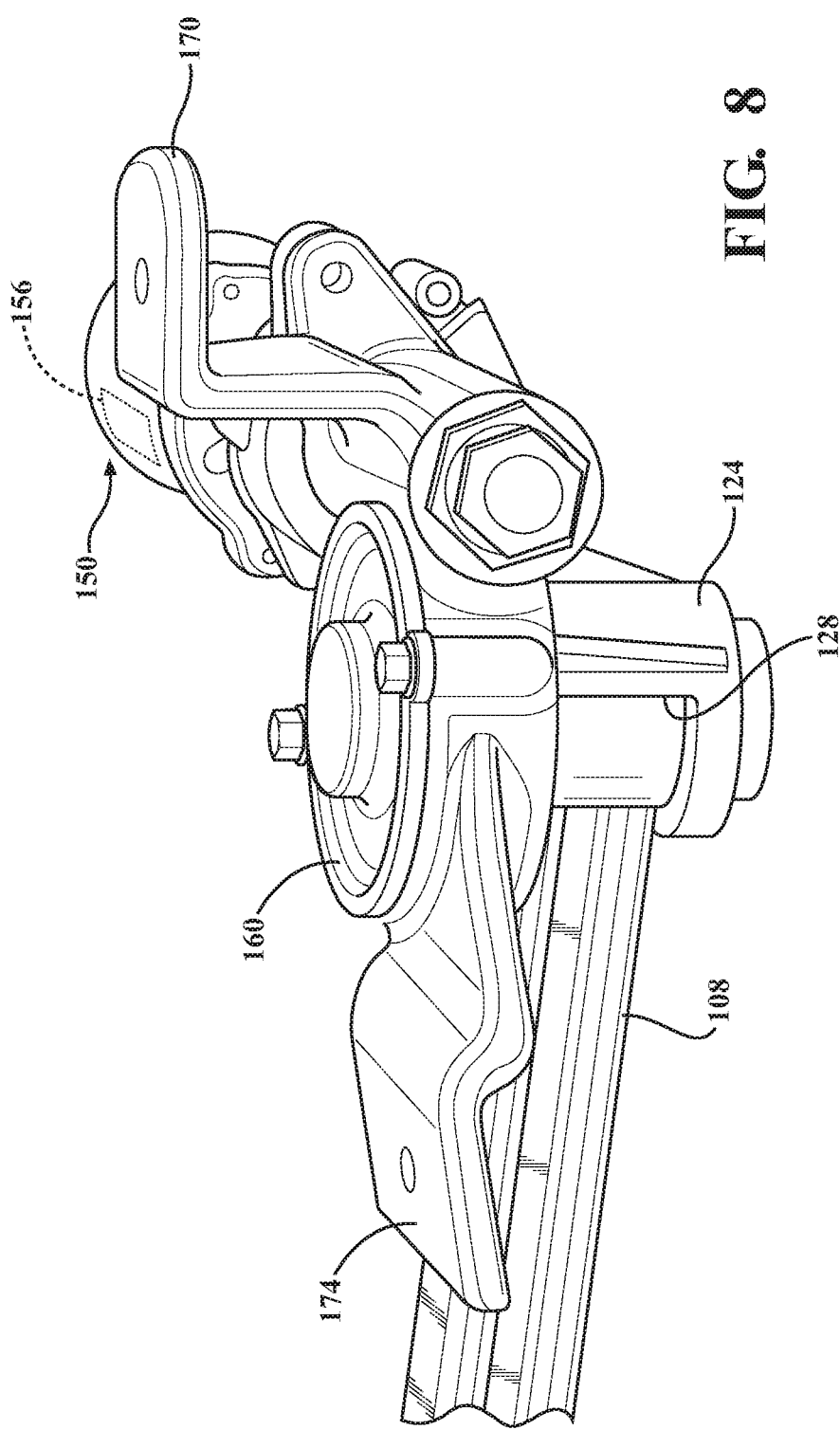
FIG. 8 is an enlarged perspective view of the housing with an opening for receiving the drive arm, mounting bracket for connecting to a motor vehicle, and a motor assembly coupled to the housing.

The following description of the preferred embodiment(s) is merely exemplary in nature and is in no way intended to limit the invention, its application, or uses.

Referring to FIGS. 1-12 generally, there is provided a compact power running board assembly, shown generally at 100, according to the present invention, including at least one drive swing arm mechanism, shown generally at 102, and at least one idler swing arm mechanism, shown generally at 104. A running board 106 is connected to a first swing arm 108 (or "pivot linkage" or "drive arm") of the drive swing arm mechanism 102 and to a second swing arm 110 of the idler swing arm mechanism 104 at outboard pivot sub-assemblies indicated generally at 112 ("pivot sub-assemblies").

The pivot sub-assemblies 112,112 are arranged generally vertically in the motor vehicle installed position. Alternative arrangements are contemplated depending on the application without departure from the scope of the present invention. Preferably, the bottom of the pivot sub-assemblies 112 are secured to a bottom surface of the running board 106 by at least one mounting bracket 114 with at least one fastener 116. Preferably, the top of the pivot sub-assemblies 112 are secured to a channel 118 formed in the running board 106. However, any other mounting structures suitable for securing to the running board 106 are contemplated depending on the application without departure from the scope of the present invention.

The first and second swing arms 108,110 are generally parallel to one another and move the running board 106 from at least one stowed position to at least one deployed position. The running board 106 includes a step surface 120, preferably, a top treaded surface, for use in the at least one deployed position.

At least one compact power running board 100 is connected to the motor vehicle in at least one predetermined location to at least one vehicle component, e.g., connected to metal framing, connected to motor vehicle frame adjacent to a rocker panel, adjacent a bumper, adjacent a body panel, connected to any other predetermined metal or composite component(s), etc. Preferably, the running board is moved, most preferably swung, generally horizontally from the stowed position under the vehicle in a generally outward direction to at least one deployed position that provides a user step for accessing a front and/or rear driver/passenger compartment of a motor vehicle, such as a sport utility vehicle. Most preferably, the swing arms 108,110 form a linkage, indicated generally at 111, that rotates the running board 106 horizontally and outward in unison to the at least one deployed position.

Figure 9:
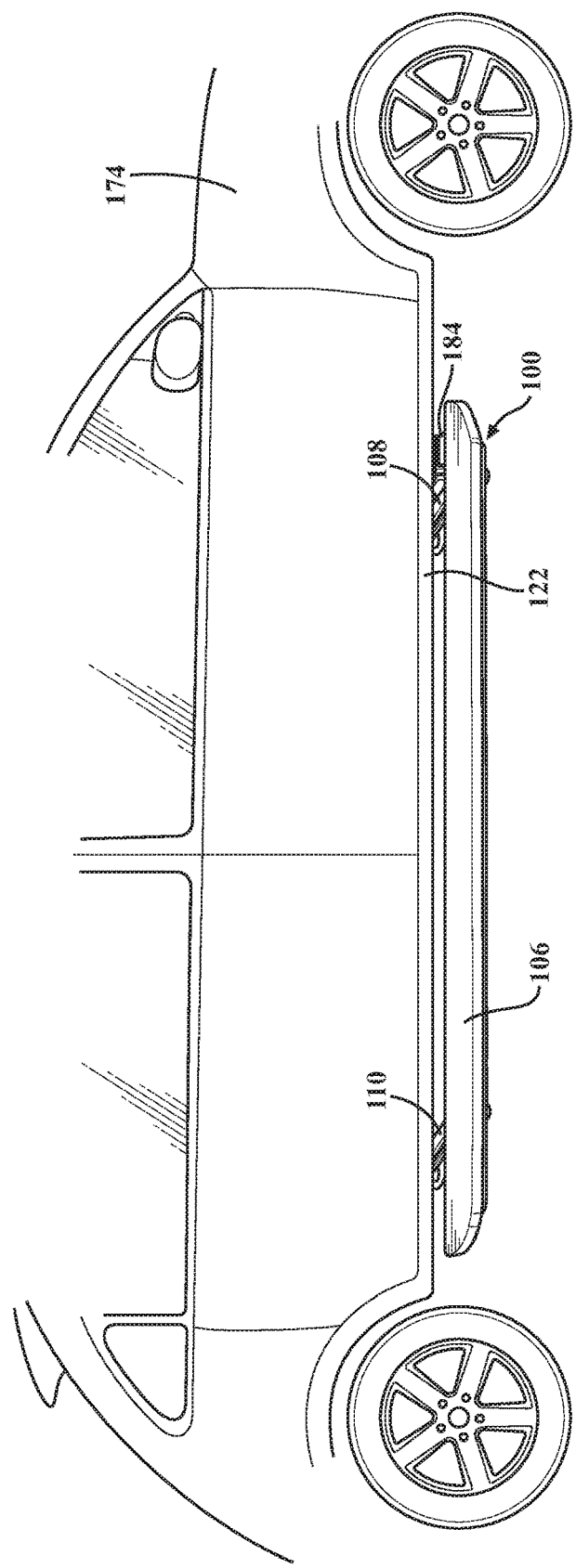
FIG. 9 is a perspective view of the compact power running board assembly in a deployed position shown in an environment of use mounted to a motor vehicle.
Figure 10:
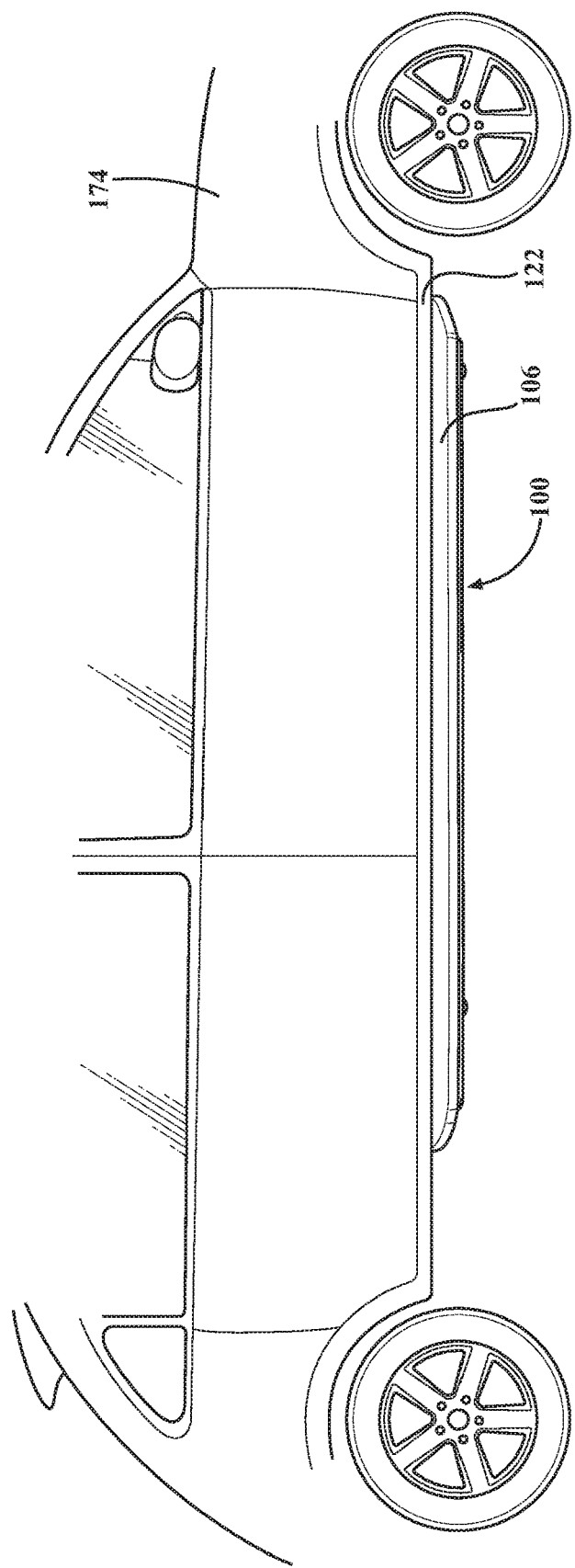
FIG. 10 is a perspective view of the compact power running board assembly in a stowed position shown in an environment of use mounted to the motor vehicle.

When in the stowed position, the running board 106 is generally at least partially positioned under the vehicle, typically, substantially under the vehicle, preferably, with the outboard edge 121 of the running board 106 generally adjacent and below an outer vehicle component 122 (e.g., a rocker panel, body panel or any other predetermined panel or component of any kind of the motor vehicle). FIG. 9 illustrates an exemplary deployed position. FIG. 10 illustrates an exemplary stowed position.

The drive swing arm mechanism 102 also includes at least one housing 124 and an actuator assembly shown generally at 126. Preferably, the actuator assembly is a rotary assembly arrangement. Alternative actuators are contemplated depending on the application without departure from the scope of the present invention, including, but not limited to, linear actuators, pneumatic, hydraulic, ball screw/nut linear actuator, gear driven linear actuator, belt driven linear actuator, and etc.

The housing 124 has at least one opening 128 that receives the first swing arm 108. An inboard pivot shaft 130 ("pivot shaft") is located within the housing 124, and first and second bushing bearings 132 and 134 are operably coupled to the pivot shaft 130 and located within the housing 124. The pivot shaft 130 and bushings 132, 134 are completely contained within the housing 124 and do not extend outside of the housing 124. The first swing arm 108, however, extends through the housing opening 128 and is operably connected to the pivot shaft 130 within the housing 124 at a location along the pivot shaft 130 between the first and second bushings 132, 134. The opening 128 in the housing 124 is sized to also allow the first swing arm 108 to rotate between the stowed position and the at least one deployed position without interference by the housing 124 structure.

The pivot shaft 130 is of a predetermined length and the first and second bushings 132, 134 are spaced a predetermined effective distance apart on the pivot shaft 130, depending on the application, for allowing a better and balanced force condition. With the bushing span distance being longer, there is a reduction in the busing and housing reaction forces. The first and second bushings' 132, 134 reaction forces are significantly reduced, in accordance with the present invention, e.g., at least about 2 times less. By way of non-limiting example, with a 1000 N directional force applied to the pivot shaft 130 generally where the first swing arm 108 is connected (at a predetermined location between the first and second bushings 132, 134), about a 500 N reaction force is applied to the first bushing 132 and about a 500 N reaction force is applied to the second bushing 134.

The pivot bushing arrangement is a significant advantage over known arrangements since it provides a lighter weight, lower profile assembly with an improved balanced force condition providing a robust yet more compact design for motor vehicles such as SUVs.

At least one thrust bearing 136 is provided on the pivot shaft 130 between the first bushing 132 and the first swing arm 108. The thrust bearing 136 functions as a spacer. Additionally, directional force from the swing arm 108 is transferred to the thrust bearing 136 where it is then transferred on to the first bushing 132. Preferably, the thrust bearing 136 is a bronze annulet, however, alternative suitable materials are contemplated without departure from the scope of the present invention.

A gap 138 of predetermined width is provided between the pivot arm 108 and the housing 124, longitudinally and/or horizontally disposed. Preferably, the gap is at least 0.2 mm wide, most preferably, about 0.5 mm. At least one first seal 140 and at least one second seal 142 are provided to protect against moisture within the housing 124. Most preferably, the first and second seals 140, 142 are oil seals. The first seal 140 is located below the swing arm 108 on the outside of the thrust bearing 136 to protect against water that entered from the opening 128 in the housing 124. The second seal 142 is located above the swing arm 108 between the housing 124 and a hub 144. Since there is a gap 138 to the pivot arm 130 but there are the first and second seals 140, 142 provided, the moisture that entered the housing 124 through the opening 128 eventually comes back out of the opening 128.

The actuator assembly 126 is preferably a rotary actuator including a worm gear 146 in mesh with a worm wheel 148 (e.g., peripheral teeth of the worm wheel 148 in operably meshing engagement with spiral threads of the worm gear 146), and a motor assembly, shown generally at 150, operably coupled to the worm gear 146. The meshing engagement can also prevent back driving of the running board when deployed. The hub 144 is part of the worm wheel 148 and encircles the pivot shaft 130. At least one key member 152 is provided that operably keys the first swing arm 108 and pivot shaft 130 to the worm wheel 148. The key member 152 is preferably steel. Alternatively, the key member 152 keys to the swing arm 108 and worm wheel 148.

The motor assembly 150 is controlled by an electronic control unit (ECU), shown generally at 154, to effect movement of the running board 106 between the stowed position and the at least one deployed position. Under predetermined conditions the ECU 154 supplies voltage to the motor assembly 150 to cause rotational movement of the motor 150 device, preferably, to a planetary gear device indicated generally at 166. Rotation of the worm gear 146 caused by the motor 150 drives rotation of the in-meshed worm wheel 148 which in turn, since the worm wheel 148 and first swing arm 108 are keyed in to the pivot shaft 130 by the key 152, causes rotation of the pivot shaft 130 which drives pivotal movement of the first swing arm 108. Thus, rotational movement is converted into the pivotal movement that causes the linkage to swing the running board 106 outward from the stowed position to the at least first deployed position.

The arrangement of the present invention also allows the worm wheel 148, in particular, the hub 144, to be shorter, which further decreases material and the size of the housing 124.

At least one over current sensor 156 is operably coupled to the motor 150 that detects current spikes and causes the actuator assembly 126 to react to certain conditions (e.g., senses the running board 106 contacting mechanical stop(s) on the swing arm(s), contacting an obstruction, object detection, etc). By non-limiting example, if the running board 106 hits something while deploying or otherwise encounters resistance to the movement, the sensor 156 senses the current spike for override and the ECU 154 stops the application of voltage to the motor 150 and the actuator 126 will stop deploying or will stop retracting the running board 106 further while the condition exists.

At least one dome spring washer 158 is operably coupled to the pivot shaft 130 adjacent a cover 160 of the housing 124. The spring washer keeps an axial force, i.e., up and down, between the worm wheel 148 and the worm gear 146.

At least one o-ring 162 is provided adjacent the pivot shaft 130 to prevent water from the key from entering the gearing. Preferably, the o-ring is a rubber o-ring coupled to the pivot shaft 130.

The housing 124 is preferably a gear housing and provides a mount to the motor vehicle. At least one mounting bracket member, shown generally at 168, is provided on the housing 124, preferably, integrally formed with the housing 124. The mounting bracket member 168 includes at least an inboard mounting bracket 170 and outboard mounting bracket 172. The inboard mounting bracket 170 is operably connected to the motor vehicle 174 at a predetermined location further underneath the vehicle with at least one fastener. The outboard mounting bracket 172 is operably connected to the motor vehicle 174 at a predetermined location further outboard from the inboard mounting bracket 170 with at least one fastener, such as to an outermost channel under the motor vehicle 174. The mounting brackets 170, 172 are an operable predetermined length for attachment to an outboard channel and another motor vehicle component. A standing force applied to the step surface 120 is transferred to the two mounting brackets 170, 172 and mounting brackets on the idler swing arm mechanism 104.

The compact power running board assembly 100 also includes at least one mechanical stop, shown generally at 176. The mechanical stop 176 is operably connected on the first swing arm 108 or the second swing arm 110, most preferably, fixedly connected on the first swing arm 108, and is operable to cooperate with the over current sensor 156 operably coupled to the motor assembly 150. The mechanical stop 176 includes a mounting bracket 178 with at least one pair of stops shown generally at 180. Preferably, the mounting bracket 178 is substantially L-shaped and connected to the swing arm by at least one fastener 182.

The pair of stops 180 create interference with the running board 106 and the over current sensor 156 detects the interference. A first bumper 184 on a first half 186 of the mounting bracket 178 contacts a rear surface 188 of the running board 106 when the swing arm 108 is extended to the deployed position. A second bumper 190 on a second half 192 of the mounting bracket 178 contacts the rear surface 188 of the running board 106 when the swing arm 108 is retracted to the stowed position. The linkage rotates in one direction until the rear surface 188 of the running board 106 contacts the first bumper 184 to stop further rotation of the first swing arm 108 when the running board 106 reaches the deployed position, and the over current sensor/ECU 156/154 detects the current spike generated from the contact with the running board 106 and turns the motor assembly 150 off. The linkage rotates in another direction until the rear surface 188 of the running board 106 contacts the second bumper 190 of the mechanical stop 176 to stop further rotation of the first swing arm 108 and running board 106 when the running board 106 reaches the stowed position, and the over current sensor/ECU 156/154 detects the current spike generated from the contact with the running board 106 and turns the motor assembly 150 off. The first and second bumpers 184, 190 are urethane, rubber or other suitable material to prevent scratching the running board 106 and for sound deafening.

The idler swing arm mechanism 104 also includes a housing 194 (or "idler housing") with at least one opening 196 that receives the second swing arm 110. An inboard pivot shaft 198 (or "idler pivot shaft") is located within the housing 194, and first and second bushing bearings 200 and 202 (or "first and second idler bushings") are operably coupled to the pivot shaft 196 and located within the housing 194. The pivot shaft 196 and bushings 200,202 are completely contained within the housing 194 and do not extend outside of the housing 194. The second swing arm 110, however, extends through the housing opening 196 and is operably connected to the pivot shaft 198 within the housing 194 at a location along the pivot shaft 197 between the first and second bushings 200,202. The pivot shaft 198 is of a predetermined length and the first and second bushings 200,202 are spaced a predetermined effective distance apart on the pivot shaft 198, depending on the application, for allowing a better and balanced force condition. The opening 196 in the housing 194 is sized to also allow the second swing arm 110 to rotate between the stowed position and the at least one deployed position without interference by the housing 194 structure.

At least one thrust bearing 204 is operably coupled to the pivot shaft 194 between the first bushing 200 and the second swing arm 110. The thrust bearing 204 functions as a spacer. Additionally, directional force from the swing arm 110 is transferred to the thrust bearing 204 where it is then transferred on to the first bushing 200.

At least one second thrust bearing 206 is operably coupled to the pivot shaft 194 between the second bushing 202 and the second swing arm 110. The second thrust bearing 206 functions as a spacer. Additionally, directional force from the swing arm 110 is also transferred to the second thrust bearing 206 where it is then transferred on to the second bushing 202.

At least one first seal 208 and at least one second seal 210 are provided to protect against moisture within the housing 194. Most preferably, the first and second seals 208,210 are oil seals. The first seal 208 is located below the swing arm 110 on the outside of the thrust bearing 204 to protect against water that entered from the opening 196 in the housing 194. The second seal 210 is located above the swing arm 110 on the outside of the second thrust bearing 206 to protect against water that entered from the opening 196 in the housing 194. Any moisture that entered the housing 194 through the opening 196 can eventually come back out of the opening 196.

The housing 194 also provides a mount to the motor vehicle. At least one mounting bracket member, shown generally at 212, is provided on the housing 194, preferably, integrally formed with the housing 194. The mounting bracket member 212 includes at least an inboard mounting bracket 214 and outboard mounting bracket 216. The inboard mounting bracket 212 is operably connected to the motor vehicle 174 at a predetermined location further underneath the vehicle with at least one fastener. The outboard mounting bracket 214 is operably connected to the motor vehicle 174 at a predetermined location further outboard from the inboard mounting bracket 212 with at least one fastener, such as to the outermost channel under the motor vehicle 174. The mounting brackets 212,214 are an operable predetermined length for attachment to an outboard channel and another motor vehicle component. A standing force applied to the step surface 120 is transferred to the two mounting brackets 212,214 and mounting brackets 170, 172 on the drive swing arm mechanism 102.

The electronic control unit 154 electronically controls the motor assembly 150 to effect movement of the running board 106 between the stowed position and at least one deployed position. The electronic control unit 154 is mounted within the motor vehicle 174 at a location remote from the housing assembly 124 or operably coupled to the assembly. The electronic control unit 154 is electrically connected to the motor assembly 150, to a wiring harness of the motor vehicle, and to a switch member 218, e.g., incorporated into a door of the motor vehicle. The switch member 218 can be a door-actuated switch member that is part of the motor vehicle and is controlled in a conventional manner by the door. The wiring harness supplies the electrical power from the vehicle electrical system to the ECU 154 of the running board assembly 100 through electrical wire members 220. The structure and operation of a conventional switch member which is operationally interconnected to the vehicle door is well known. It is understood by one skilled in the art that such switch members are toggled by the opening or the closing of the vehicle door associated therewith to open and close an electrical circuit. Wire members 222 provide electrical connection between the ECU 154 and the motor assembly 150 so that the ECU 154 can supply electrical power from the vehicle electrical system to the motor assembly 154 to effect the bi-directional operation thereof. The switch member 218 is operably connected to the ECU 154 by wire members or by a wireless connection, e.g., wire members 224 provide electrical communication between the ECU 154 and the switch member 218.

In one embodiment, the switch member 218 is a door ajar switch in a door latch. The motor assembly 150 is energized to move the running board 106 from the stowed position to a deployed position upon receiving a signal from the door ajar switch indicating that the vehicle door has been opened. The motor assembly 22 is energized to return the running board 106 to the stowed position upon receiving a signal from the door ajar switch indicating that the vehicle door has been closed. Alternatively, or additionally, a motor vehicle body mounted switch 226, that is accessible by a user to activate the running board 106 when desired, initiates movement of the running board 106. The body-mounted switch 226 is operably connected to the ECU 154 by wire members or by a wireless connection. Alternatively, or additionally, an end cap switch 228 or key fob is provided to initiate movement of the running board 106. The running board 106 may be hand-operated, or foot-operated if hands-free operation of the running board 106 is desired, using the switches. Upon activation of one of the switches 224, 226, 226 or the key fob, a signal is sent to the ECU 154 and the ECU 154 sends appropriate voltage to the motor assembly 150.

The height of the compact power running board assembly 100 is particularly suitable for motor vehicles with less ground clearance, such as sport utility vehicles, while maximizing the ground clearance that is available to help prevent assembly 100 contact against motor vehicle driving surfaces or objects thereon.

The running board 106 is preferably an extruded aluminum. Other materials are contemplated depending on the application without departure from the scope of the present invention. The first and second swing arms 108,110 are preferably cast aluminum. Other materials are contemplated depending on the application without departure from the scope of the present invention. The housing is preferably cast aluminum. Other materials are contemplated depending on the application without departure from the scope of the present invention.

It is understood that, alternatively, the assembly 100 is adapted to have the drive swing arm mechanism 102 and idler swing arm mechanism 104 locations switched, as in the drive swing arm mechanism 102 may be located where the idler swing arm mechanism 104 is illustrated in the figures and the idler swing arm mechanism 104 would then be located where the drive swing arm mechanism 102 is illustrated in the figures.

Figure 11:
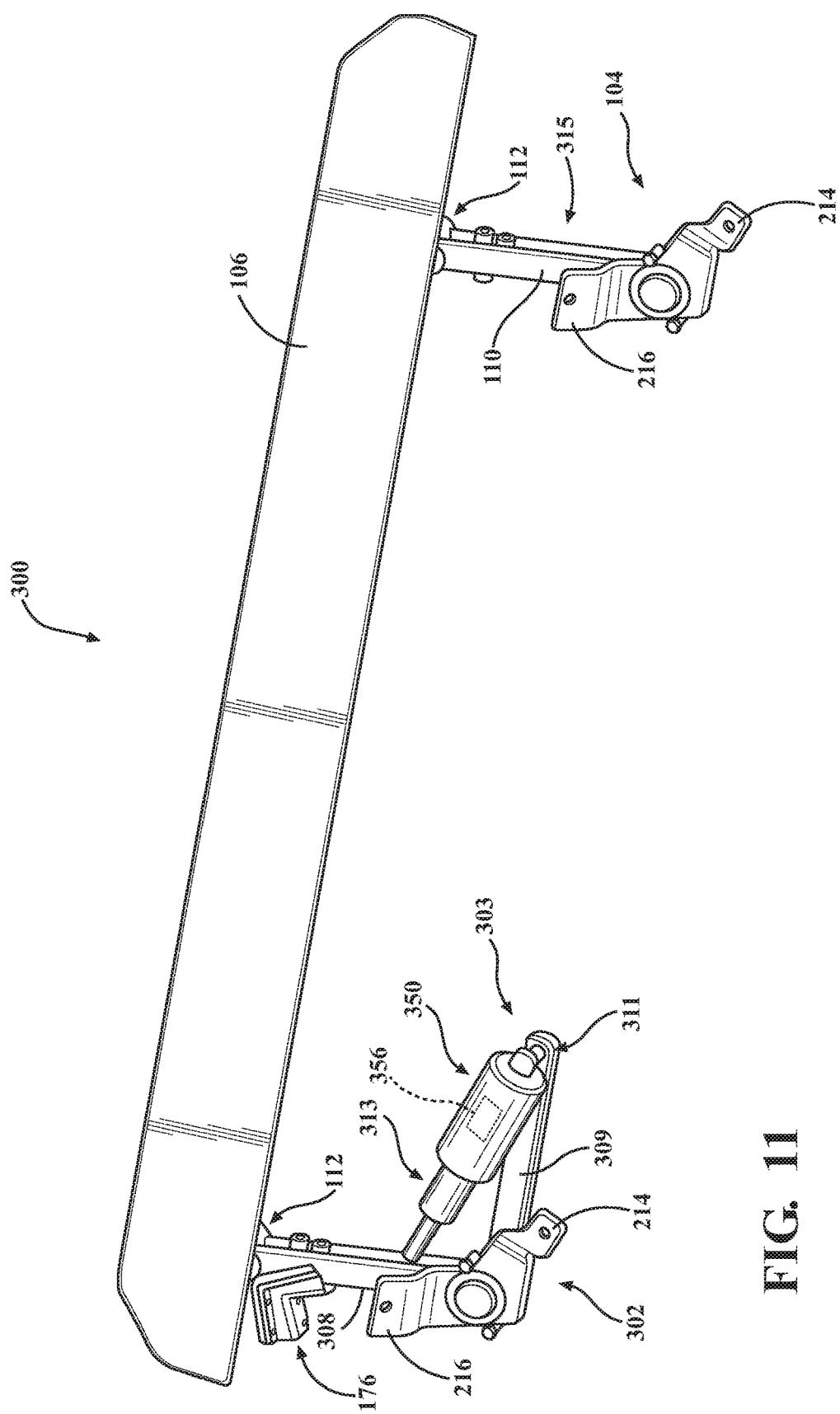
FIG. 11 is a perspective view of a compact power running board assembly with a linear actuator assembly, depicted in a deployed position, according to an embodiment of the present invention.
Figure 12:
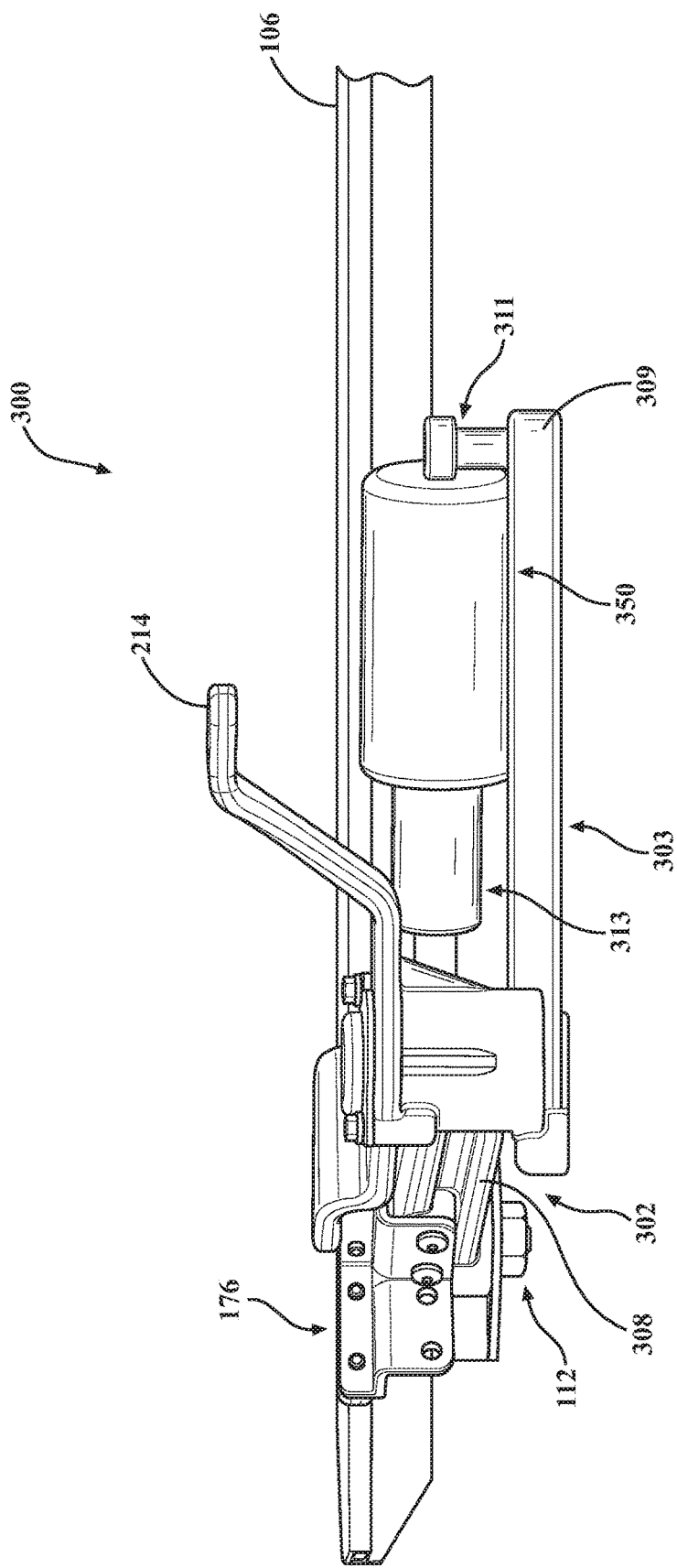
FIG. 12 is a rear elevation of FIG. 11.

In accordance with an embodiment of the present invention, a compact power running board assembly is provided, shown generally at 300 in FIGS. 11-12, with linear actuation, wherein like numbers indicate like parts to the compact power running board assembly 100. The compact power running board assembly 300 includes at least one drive swing arm mechanism, shown generally at 302, and at least one idler swing arm mechanism 104. In this embodiment, a linear actuator assembly is added, as indicated generally at 303. The running board 106 is connected to a first swing arm 308 of the drive swing arm mechanism 302 and to the second swing arm 110 of the idler swing arm mechanism 104 at the pivot subassemblies 112,112. The assembly 300 is provided with the at least one mechanical stop 176 and a motor assembly shown generally at 350 with at least one over current sensor 356 operably coupled to the motor assembly 350.

As described previously, the idler swing arm mechanism 104 includes a housing 194 with inboard and outboard mounting brackets 214,216 to connect to the motor vehicle 174, and the housing 194 has an opening 196 to receive the second swing arm 110 into the housing 194, which swing arm 110 is operably coupled to the inboard pivot shaft 198 inside the housing 196 at a predetermined location between the first and second bushings 202,204 located within the housing. This arrangement provides a compact unit and a balanced force condition. Thrust bearings 204,206 for transferring force are operably coupled to the pivot shaft 198 below and above the swing arm 110, respectively, and first and second seals 208,210 are operably coupled to the outside of the thrust bearings 204,206 to protect against moisture. Preferably, the drive arm mechanism 302 is identical thereto. Thus, most preferably, the gearing is not present in the housing of the drive swing arm mechanism 302, e.g., no worm gear 146 or worm wheel 148, and the housing and interior features of the drive swing arm mechanism 302 are substantially similar to the idler side in accordance with this embodiment.

The swing arms 308,110 form a linkage, indicated generally at 315, that rotates the running board 106 generally horizontally between the stowed position and the at least one deployed position until the board 106 contacts the mechanical stop 176 and current spikes are detected, similarly as set forth previously. However, rather than rotary actuation, the linear actuator assembly 303 moves the first swing arm 308 between the stowed position and any predetermined deployed position(s).

The linear actuator assembly 303 is operably connected to a third arm 309 at a first pivot 311 and is operably connected to the first swing arm 308. Preferably, the other end of the third arm 309 is operably connected to the housing of the drive swing arm mechanism 302. The linear actuator assembly 303 includes the motor assembly 350 and a cylinder or lead screw assembly, shown generally at 313. The motor assembly 350 is operably electrically connected to the ECU 154.

The motor assembly 350 generally includes a motor with gearbox reduction. Preferably, a planetary gear. Most preferably, a two-stage planetary gear. The gearbox can be a planetary gear, worm gear, or other suitable gear train.

The motor assembly 350 is illustrated outside and in-line with the cylinder or lead screw assembly 313. However, it is understood that the assembly 303 is adaptable for having an in-line or off-line motor assembly 350. In addition, it is understood that the assembly 303 is adaptable for having an in-line or off-line motor gear reduction box. The linear actuator assembly 303 uses a lead screw/spindle or screw-nut. The assembly 303 can use a pneumatic cylinder or hydraulic cylinder. Thus, the linear actuator assembly 303 generally includes either or a combination of the following: in-line or off-line motor; in-line or off-line gear reduction box; gearbox that is planetary gear, worm gear or other gear train; uses lead screw/spindle or screw-nut; uses pneumatic cylinder or hydraulic cylinder.

By way of non-limiting example, when a ball screw member rotates in a first direction, this causes the first swing arm 308 to pivot outward to the predetermined at least one deployed position. And when the ball screw member rotates in a second direction, this causes the first swing arm 308 to pivot inward toward the motor vehicle to the stowed position.

Figure 13:
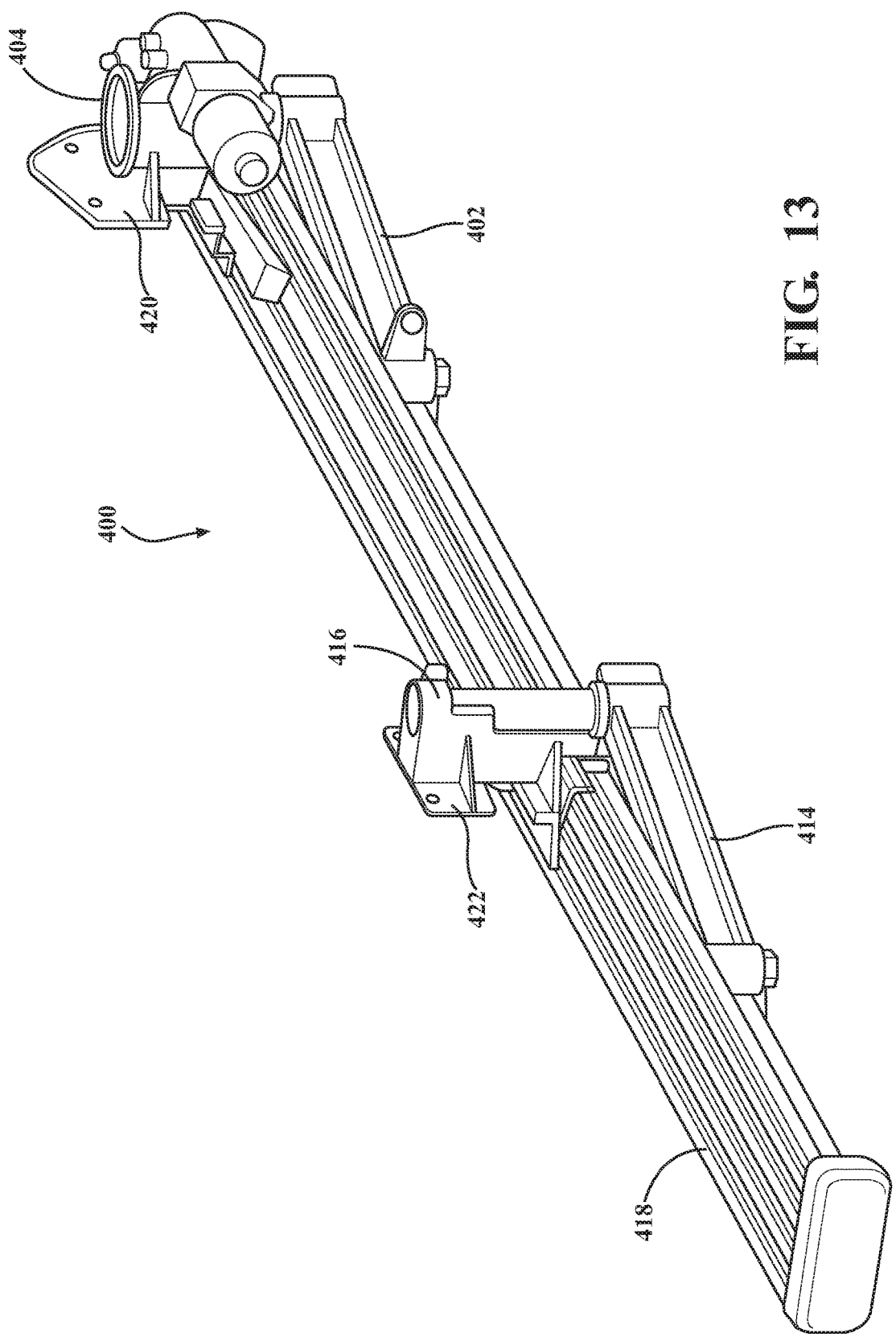
FIG. 13 is a perspective view of a known running board assembly including a running board.
Figure 14:
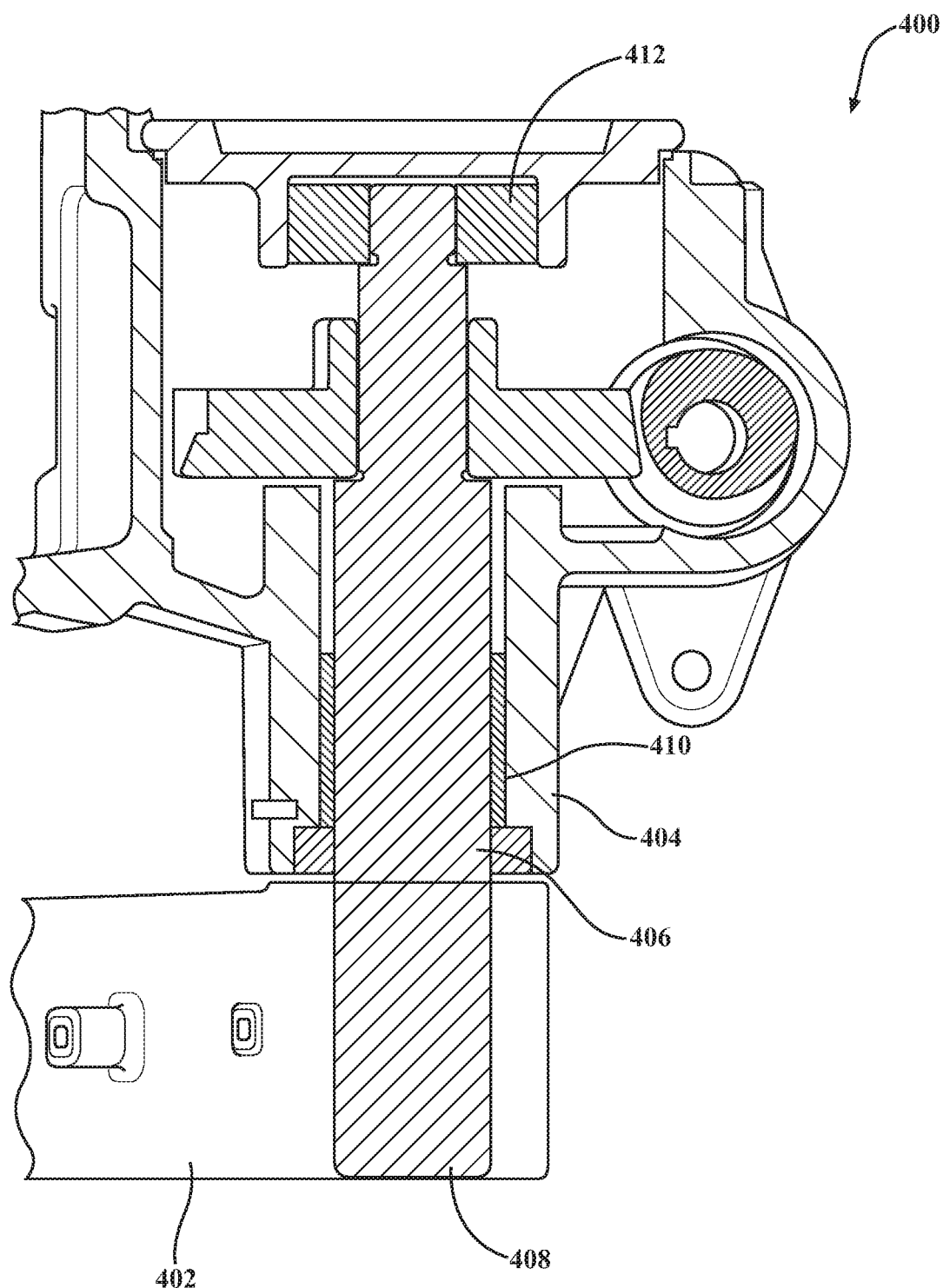
FIG. 14 is a sectional view taken through a housing of FIG. 13 and a cantilever arm connected to a pivot shaft end outside of the housing.

Referring now to FIGS. 13-14, there is illustrated a known power running board assembly shown generally at 400, which is not compact. This assembly has a higher total package height because the known cantilever structure is connected outside of the housing. In particular, a first cantilever arm 402 is connected outside of a housing 404 to a pivot shaft 406 end 408 that extends downward to the outside of the housing 404, which arrangement increases the overall height of the assembly. The increased height is at least about twice that of the present invention. The assembly 400 is particularly suited for larger motor vehicles such as pickup trucks.

A first bushing 410 and a second bushing 412 are coupled to the pivot shaft 406 inside of the housing 404. Thus, the cantilever arm 402 is located outside of the housing 404 and additionally is not located between the first and second bushings 410,412. To avoid high internal force due to this arrangement, the housing 404 must be larger in size, which also adds material and weight.

By way of example, with a 1000 N directional force applied to the pivot shaft 406 where the cantilever arm 402 is connected, a 1500 N reaction force is applied to the first bushing 410 and a 500 N reaction force is applied to the second bushing 412. Thus, the force applied to the first bushing 410 is at least about 3× higher than in the present inventive example set forth above and about 3× higher than the force applied to the second bushing 412. In addition, the total pivot shaft 406 height is at least about twice as long as the present invention.

A second cantilever arm 414 is connected to a pivot shaft end extending outside of a hub structure 416 as well. Both the first and second cantilever arms 402,414 are connected to a running board 418. The housing 404 includes a mounting bracket 420 and the hub structure 416 includes a mounting bracket 422 arranged vertically in the vehicle installed position for mounting to the frame of a motor vehicle with a plurality of fasteners.

The power running board assembly generally 400 has longer cantilever arms 402,414 and running board 416 length as well. All the aforementioned factors make the known larger, heavier assembly more suitable for larger motor vehicles.

Referring to now to FIGS. 15-18 and 21 generally, a running board assembly, generally shown at 10, in one embodiment includes a running board 12, a housing assembly 14, a drive arm 16, an idler arm 18, a linear actuator assembly 20, a motor assembly 22, an electronic control unit 24, and at least one mounting bracket 26. The mounting bracket 26 is adapted for attachment to a frame of a motor vehicle 28.

The running board 12 has a top wall 30 providing a tread surface 32 therealong. The running board 12 is connected to the drive 16 and idler 18 arms at pivots generally shown at 34. The pivots 34 are arranged generally vertically in vehicle installed position and include a shaft extending through a bore in the end of the drive 16 and idler 18 arms and retained in place by a retaining ring. The idler arm 18 is mounted to a hub structure 36 which pivotally secures the idler arm 18 to a rear bracket 38. The rear bracket 38 is mounted to the mounting bracket 26 which is attached to the frame of the motor vehicle 28. It is appreciated that although a single idler arm 18 is shown, the running board assembly 10 in another embodiment may include more than one idler arm 18.

Figure 16:
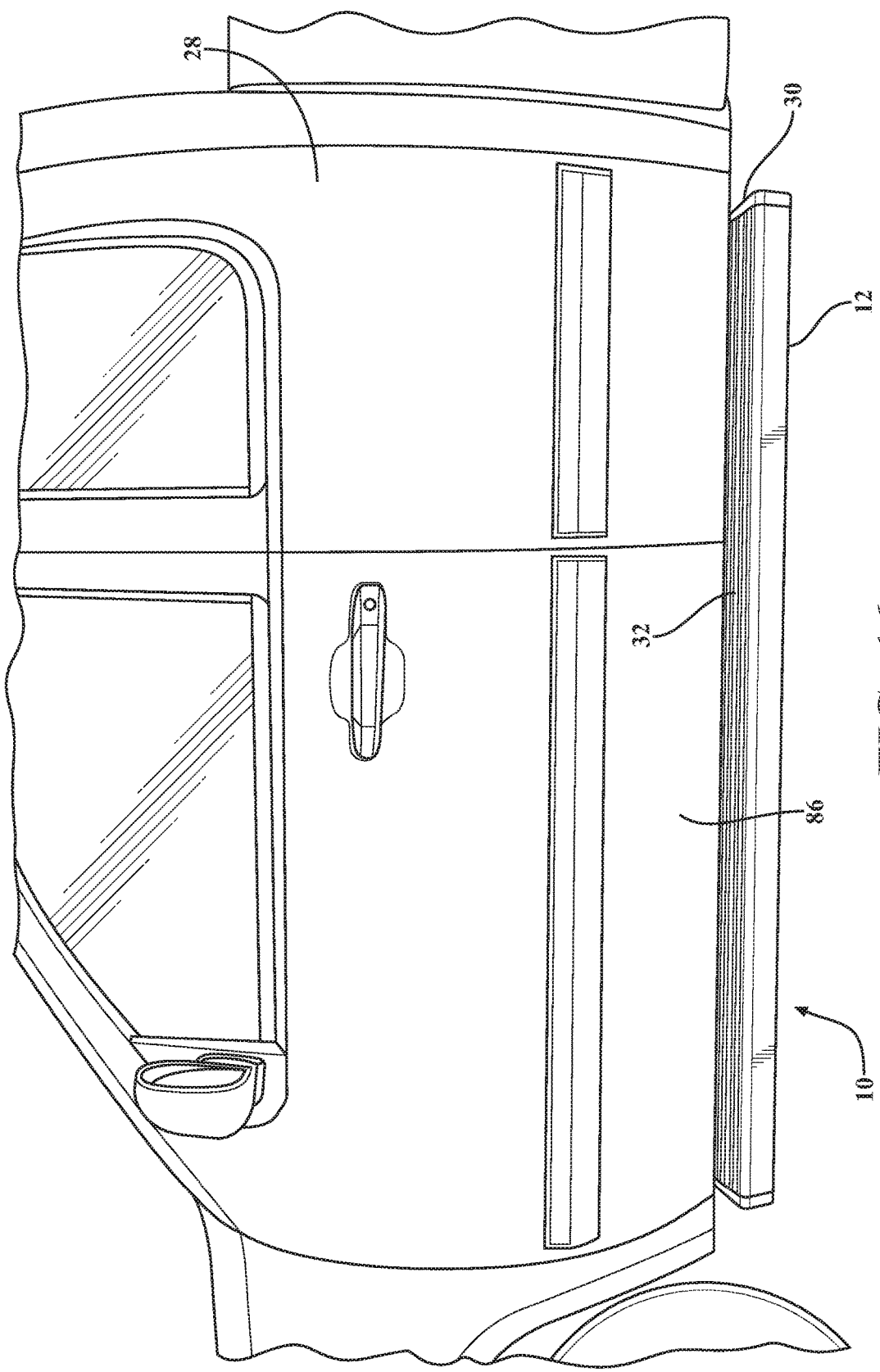
FIG. 16 is a side view of a motor vehicle including the running board in a stowed position.
Figure 17:
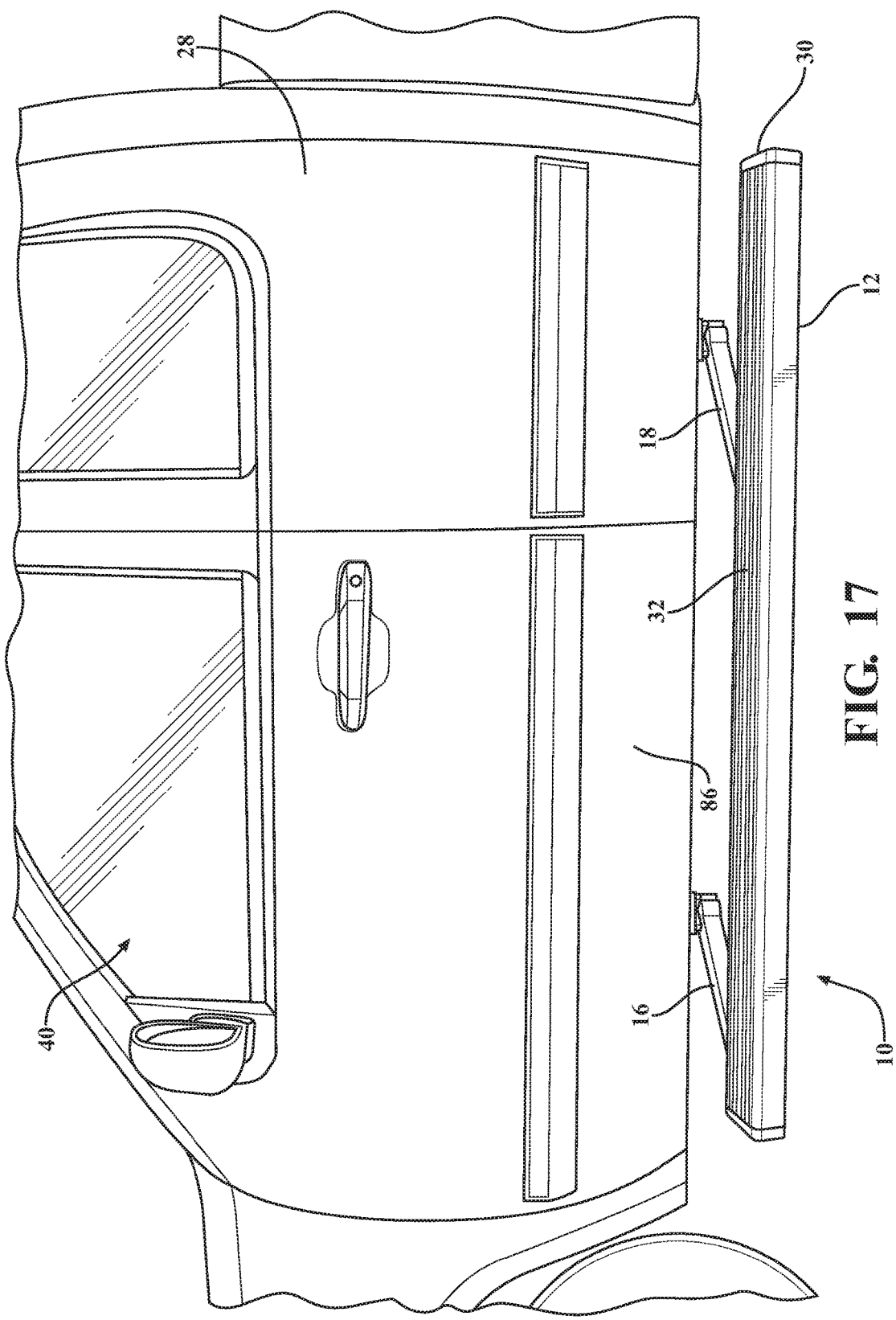
FIG. 17 is a side view of the motor vehicle including the running board in a cab entry position.
Figure 18:
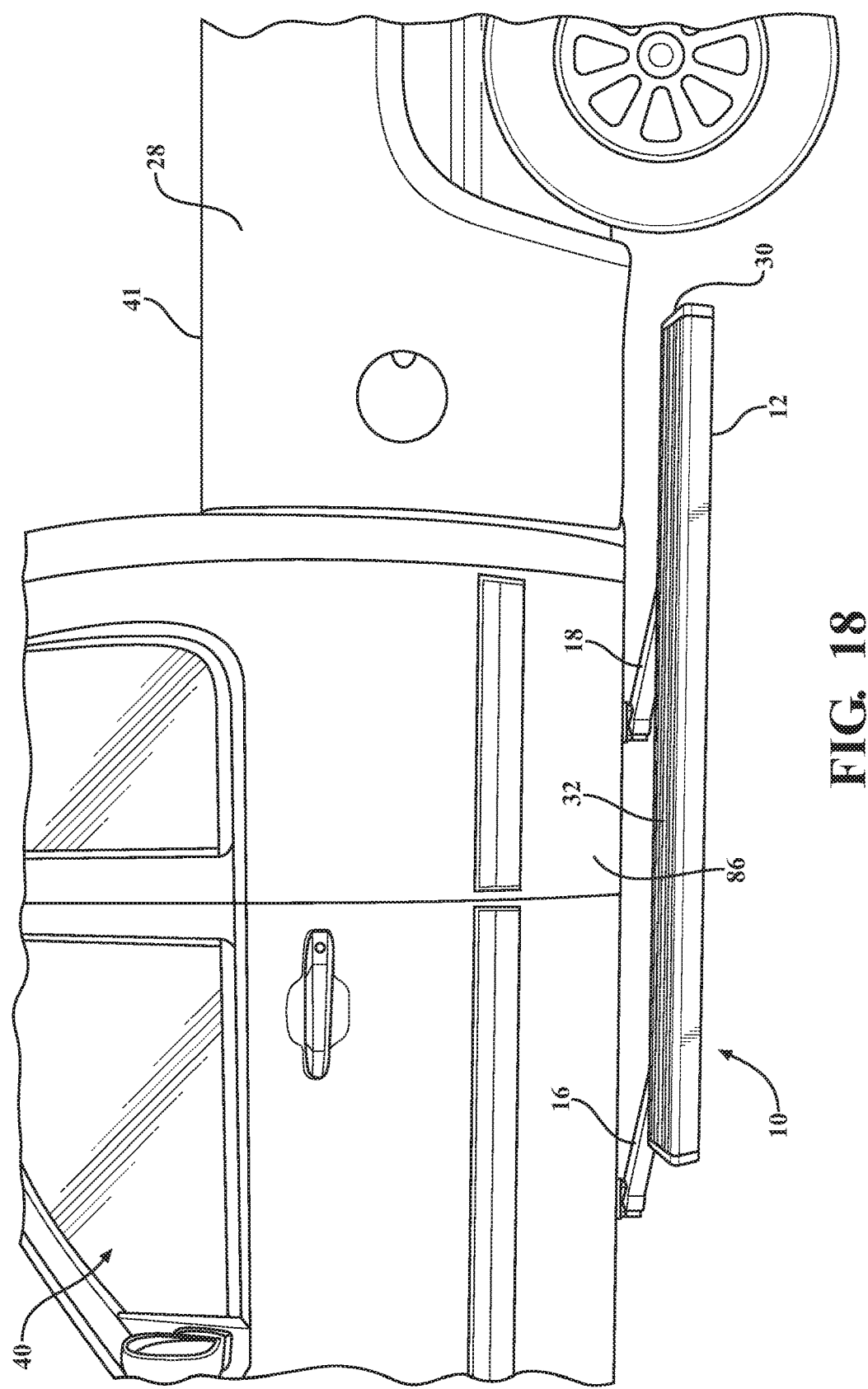
FIG. 18 is a side view of the motor vehicle including the running board in a box side step position.

The drive 16 and idler 18 arms form a parallel linkage which pivotally couples the running board 12 to a frame of the motor vehicle 28 for movement between a stowed position, as shown in FIG. 16, a cab entry position, as shown in FIG. 17, and a box side step position, as shown in FIG. 18. In the stowed position, the running board 12 is generally tucked underneath the motor vehicle 28 so as to be somewhat hidden from view and to provide a cleaner, more integrated look to the motor vehicle 28. In the cab entry position, the running board 12 extends generally outwardly from the motor vehicle 28 to assist users entering or exiting a passenger cab generally indicated at 40. And in the box side step position, the running board 12 extends generally outwardly from the motor vehicle 28 and is disposed rearward as compared to the cab entry position in order to allow users side access to a box 41 of the motor vehicle 28. The running board 12 provides a more useful step surface with improved step length for box access as compared to a separate frame mounted side step.

Figure 19:
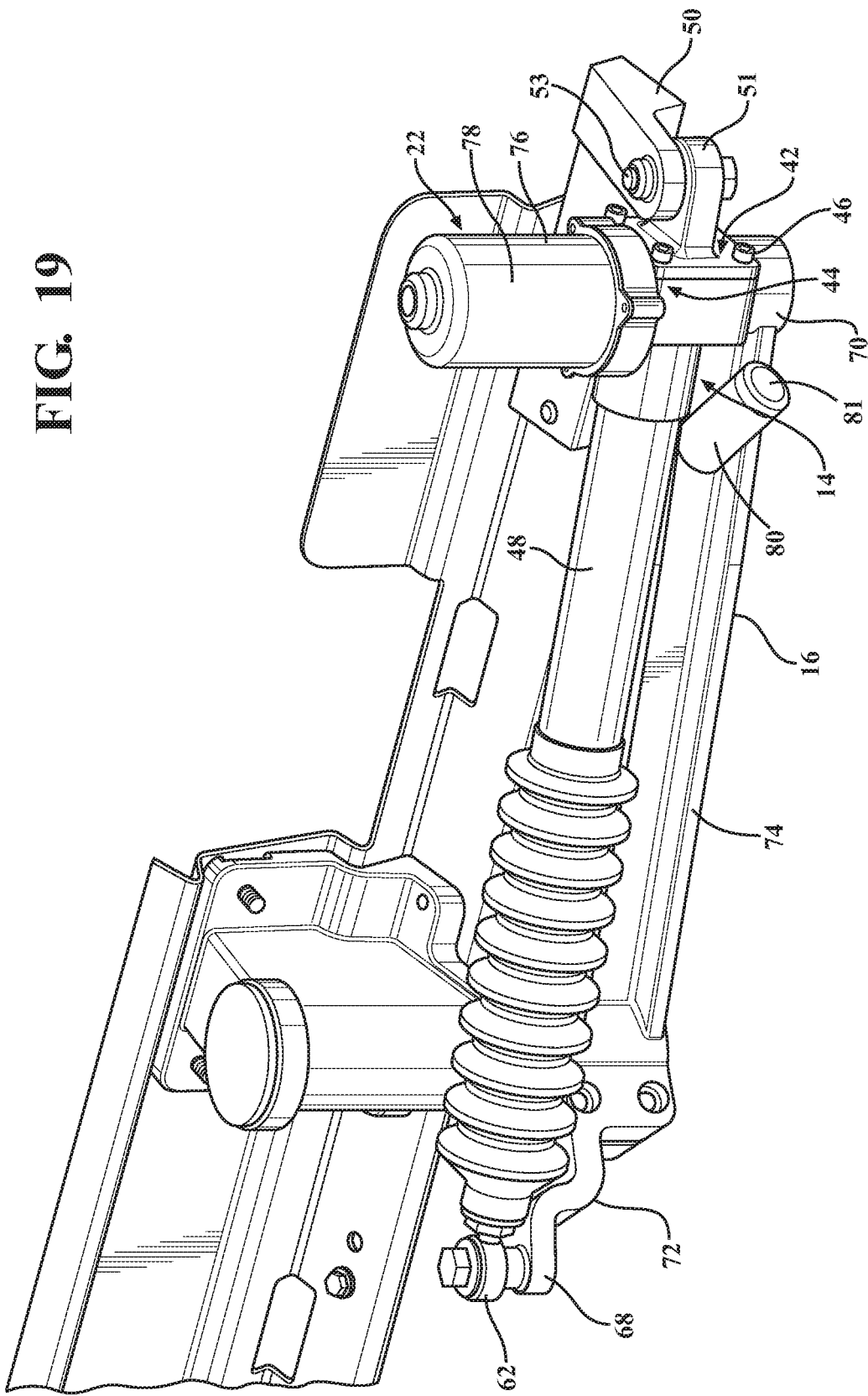
FIG. 19 is a perspective view of a housing assembly with a linear actuator assembly, a drive arm, and a motor assembly of the running board assembly.
Figure 20:
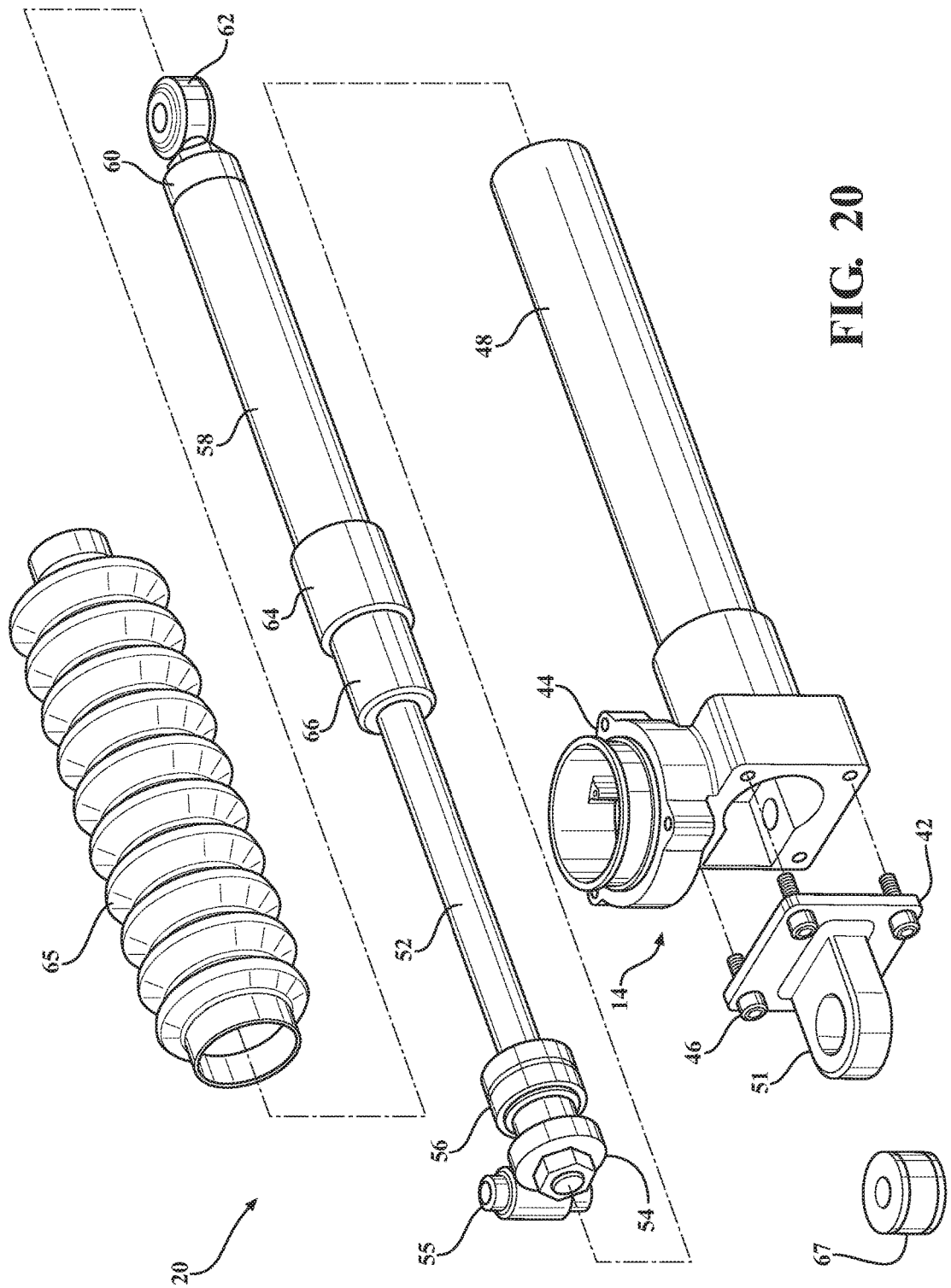
FIG. 20 is an exploded view of the linear actuator assembly of the running board assembly.
Figure 21:
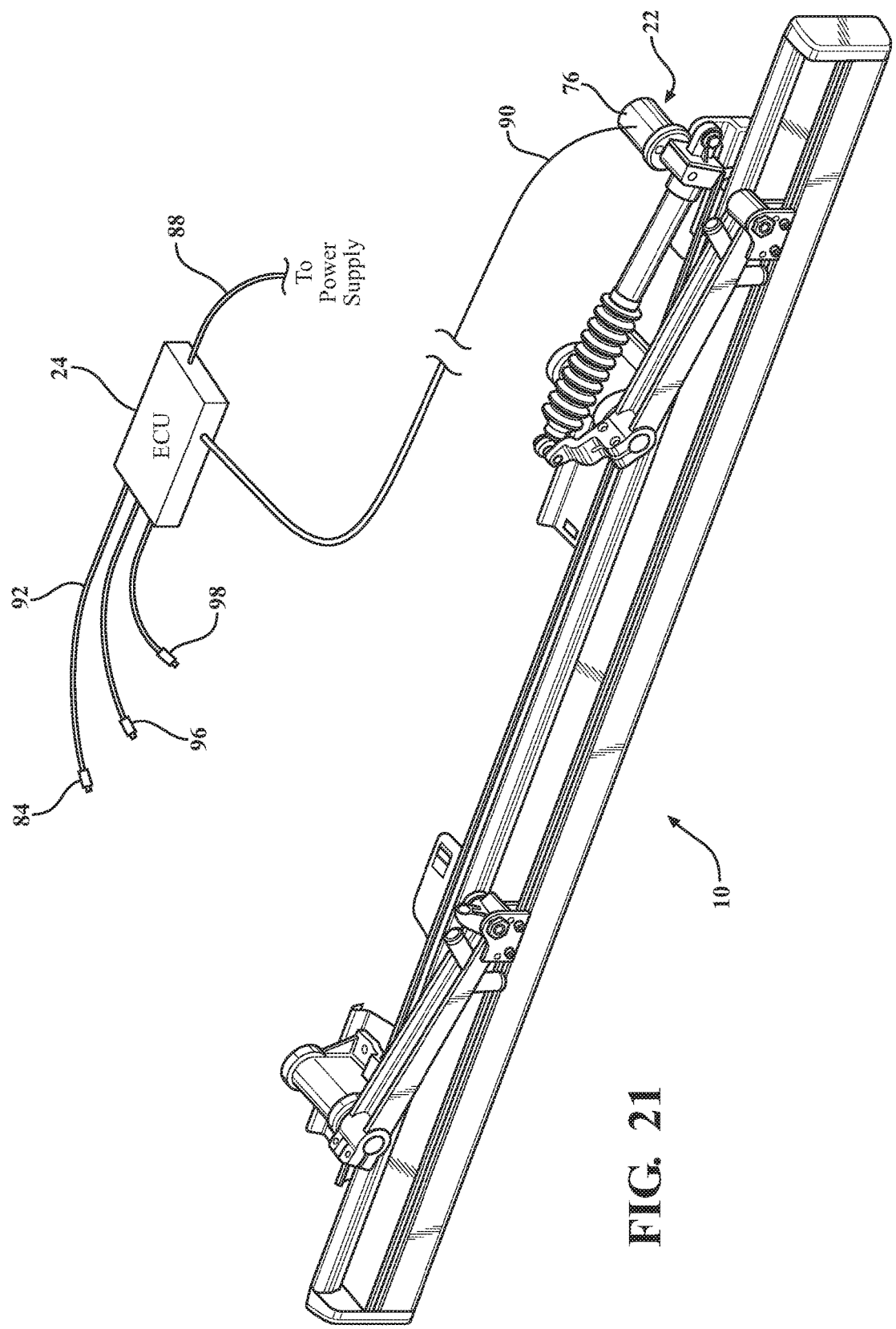
FIG. 21 is a perspective view of the running board assembly including an electronic control unit.

Referring to FIGS. 19 and 20, the housing assembly 14 includes a cover structure 42 and a main housing structure 44. The cover structure 42 is secured to the main housing structure 44 by a plurality of cover fasteners 46, e.g., cover screws. The cover structure 42 and the main housing structure 44 define an internal chamber within the housing assembly 14. The housing assembly 14 also includes a steel tube portion 48, a rear bracket 50, and a bracket 51 integrally formed with the cover structure 42 and having an aperture for receiving a fastener 53, e.g., nut and bolt arrangement, for securing to the rear bracket 50. Another bearing 67, e.g., spherical bearing with nitrile seals, is coupled to the bracket 51. The rear bracket 50 of the housing assembly 14 is secured to the mounting bracket 26 adapted for attachment to the frame of the motor vehicle 28.

The linear actuator assembly 20 includes a ball screw member 52 disposed within the steel tube portion 48 and rotatable relative thereto. The ball screw member 52 is operably coupled to the motor assembly 22. A worm member 54, e.g., plastic worm gear, is fixedly mounted toward an end of the ball screw member 52 for rotation therewith, and includes a lead worm self locking member, generally shown at 55, e.g., worm gear with self locking 4 degree lead angle. The worm member 54 can be of any suitable configuration. A plurality of tapered roller bearings 56, e.g., at least two, are mounted on an exterior surface of the worm member 54 and/or ball screw member 52. The linear actuator assembly 20 also includes an actuator shaft tube 58 with a tube insert 60 at one end operably coupled to a spherical bearing 62, e.g., a spherical bearing having a PTFE liner (polytetrafluoroethylene) fitted therein and fixedly secured to the bearing 62, preferably, spherical ball bearing having stainless steel ball, PTFE liner and nitrile seals. At the other end of the actuator shaft tube 58 there is provide a bearing 64, preferably, a steel/PTFE sleeve bearing, and a ball nut 66 with internal ball return for linear movement thereof. Other suitable ball returns are contemplated without departing from the scope of the invention. The ball screw 52 and ball nut 66 have matching helical grooves. Bellows 65 are operably fitted over at least the actuator shaft tube 58, ball nut 66, and bearing 64, operable for providing an environmental seal.

Ball screws are the method of choice in linear-actuation applications in accordance with the present invention. Ball screws convert rotary input to linear motion and offer several advantages over other actuators, such as Acme screws, hydraulic or pneumatic systems, and belt, cable, or chain drives. Thus, the rotation of the ball screw 52 drives pivotal movement of the drive arm 16. It is appreciated that other suitable actuators such as, but not limited to, air cylinder/pneumatic or hydraulic cylinder type, or other suitable linear motion screws are contemplated without departing from the scope of the invention. By way of non-limiting example, in one embodiment the actuator has a linear actuator gear drive arrangement or the linear actuator assembly has a linear actuator belt drive arrangement, in accordance with another embodiment of the present invention.

It is appreciated that in one embodiment a plurality of threads may be defined on an exterior surface of the ball screw 52, in combination with operational contact with the ball nut 66 internal ball return arrangement and/or bearing 64.

Figure 15:
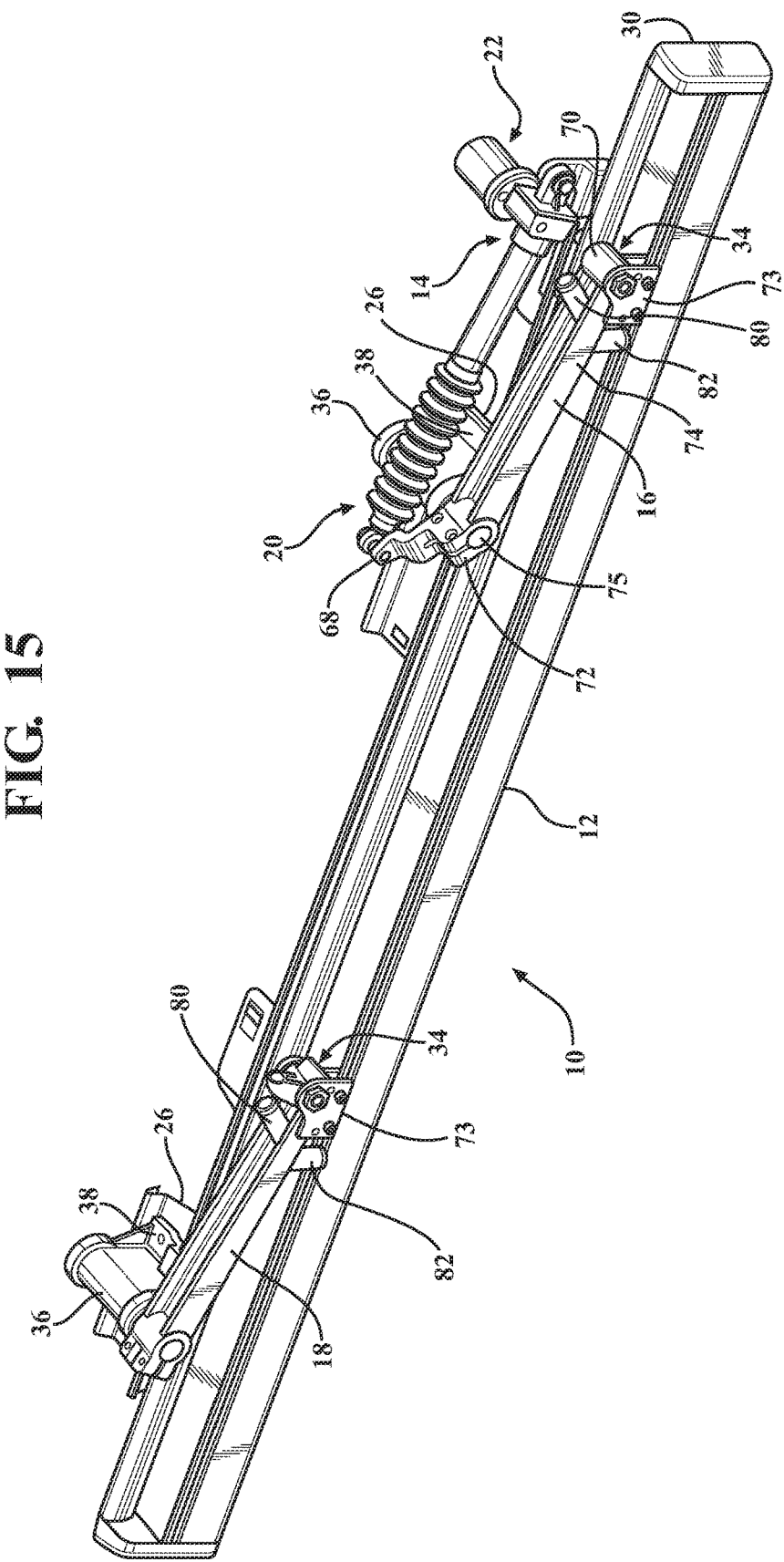
FIG. 15 is a perspective view of one embodiment of a running board assembly including a running board.

Referring to FIGS. 15 and 19 generally, the drive arm 16 includes a first end 68 rotatably coupled to the spherical bearing 62 and an opposing second end 70 rotatably coupled to a second mounting bracket 73 fixedly connected to the running board 12. The drive arm 16 includes a first link 72 pivotably connected to a second link 74 at a joint 75. The rotation of the ball screw 52 drives rotation of the first link 72 and pivotal movement about the joint 75 of the second link 74 to move relative to the first link 72 causing the running board 12 to deploy between stowed and a deployed positions. The joint 75 is mounted to another hub structure 36 which pivotally secures the drive arm 16 to a second rear bracket 38. This rear bracket 38 is mounted to the mounting bracket 26 which is attached to the frame of the motor vehicle 28.

Referring to FIGS. 15 and 19 through 21 generally, the motor assembly 22 includes a casing structure 76 which includes a position sensing and encoding motor 78 that rotates a shaft in opposing first and second directions. The motor assembly 22 is secured to the linear actuator assembly 20. More particularly, the shaft extends into the main housing structure 44 and is fixedly secured to the worm gear 54 coupled with the lead worm self locking member 55 such that activation of the motor 78 will rotate the self locking member 55 in the same direction causing rotation of the worm gear 54 which will cause rotation of the ball screw member 52. The casing structure 76 is secured to the main housing structure 44 by a second plurality of fasteners. It is appreciated that the casing structure 76 may in one embodiment be considered part of the housing assembly 12 as the housing assembly 12 maintains the worm gear and motor components sealed from the external environment.

The electronic control unit 24 electronically controls the motor assembly 22 to effect movement of the running board 12 between the stowed, cab entry, and box side step positions. The electronic control unit 24 is mounted within the motor vehicle 28 at a location remote from the housing assembly 14. The electronic control unit 24 is electrically connected to the motor assembly 22, to a wiring harness of the motor vehicle 28, and to a switch member 84 incorporated into a door 86 of the motor vehicle 28. In another embodiment, the electronic control unit 24 may be physically mounted to the housing assembly 14 or to the motor assembly 22, and electronically connected to the motor assembly 22.

The switch member 84 in one embodiment is a door-actuated switch member that is part of the motor vehicle 28 and is controlled in a conventional manner by the door 86. The wiring harness supplies the electrical power from the vehicle electrical system to the electronic control unit 24 of the running board assembly 10 through electrical wire members 88. The structure and operation of a conventional switch member which is operationally interconnected to the vehicle door 86 is well known. It is understood by one skilled in the art that such switch members are toggled by the opening or the closing of the vehicle door 86 associated therewith to open and close an electrical circuit. Wire members 90 provide electrical connection between the electronic control unit 24 and the motor assembly 22 so that the electronic control unit 24 can supply electrical power from the vehicle electrical system to the motor assembly 22 to effect the bi-directional operation thereof. Wire members 92 provide electrical communication between the electronic control unit 24 and the door-actuated switch member 84.

In one embodiment, the switch member 84 is a door ajar switch in a door latch. The motor assembly 22 is energized to move the running board 12 from the stowed position to the cab entry position upon receiving a signal from the door ajar switch indicating that the vehicle door 86 has been opened. The motor assembly 22 is energized to return the running board 12 to the stowed position upon receiving a signal from the door ajar switch indicating that the vehicle door 86 has been closed.

The running board assembly 10 has at least one stop that is internal to the actuator and/or are external stops. It is appreciated that in one embodiment there are no external stops.

In operation, starting with the running board 12 in the stowed position, when the vehicle door 86 is unlatched and pivoted outwardly from a closed position to an open position, the switch member 84 associated with the vehicle door 86 is activated and sends a control signal to the electronic control unit 24. The electronic control unit 24 in response to the control signal supplies an appropriate voltage to the motor assembly 22 to cause the motor assembly 22 to begin rotational movement in a first rotational direction which will operably cause rotation of the ball screw member 52 to convert rotary input to linear motion thereof, thereby causing pivoting of the first link 72 relative to the second link 74 about joint 75 to move the running board 12 to the cab entry position. Specifically, the motor 78 rotates the lead worm 55 causing rotation of the worm gear 54 in a first rotational direction which in turn rotates the ball screw member 52. The actuator shaft tube 58 is rotatable with the ball screw member 52 and causes the drive arm 16 to pivot outwardly away from the motor vehicle 28 to move the running board 12 to the cab entry position. The particular location of the running board 12 in the cab entry position is electronically controlled by the motor 78. The electronic control unit 24 is programmed to stop the motor 78 after a predetermined number of armature revolution counts. As a result, the exact location of the running board 12 in the cab entry position may vary depending upon when the motor 78 is programmed to stop. When the electronic control unit 24 senses that the running board 12 has reached the cab entry position, the electronic control unit 24 turns off the motor 78.

The running board 12 is retained in the cab entry position after the motor assembly 22 is shut off as a result of at least the engagement between the worm gear 54 and the ball screw member 52, as it is known that the worm gear 54 will not be back-driven by the screw member 52. Specifically, the lead worm 55 is self locking and will not be back-driven. Thus, the lead worm 55 and/or worm gear 54 will resist an external force applied to the drive arm 16 in a direction away from the cab entry position and towards the stowed position as a result of the engagement.

The running board 12 remains in the cab entry position until the door 86 of the motor vehicle 28 is returned to the closed position. When the door 86 is pivoted inwardly from the open position to the closed position, the switch member 84 associated therewith is activated and sends a signal to the electronic control unit 24. The electronic control unit 24 in response to the signal supplies an appropriate voltage to the motor assembly 22 which will pivot the drive arm 16 to move the running board 12 to the stowed position. Specifically, the shaft of the motor assembly 22 rotates the lead worm 55 causing rotation of the worm gear 54 in a second rotational direction which in turn rotates the ball screw member 52. The actuator shaft tube 58 is rotatable with the ball screw member 52 and causes the drive arm 16 to pivot inwardly towards the motor vehicle 28 to move the running board 12 to the stowed position.

It is appreciated that in one embodiment at least two stops are located on each drive arm 16 and idler arm 18 to abut the running board 12. The drive arm 16 includes a stow stop 82 and end stop 80 formed at a location between the joint 75 and second end 70. The running board 12 abuts the stow stop 82 to stop further movement of the running board 12 when the board 12 has reached the stowed position. The running board abuts the end stop 80 when the board 12 has reached the box side step position to stop further movement of the running board 12. In one embodiment, the stow and end stops 82, 80 include bumpers 81 formed from urethane or a other suitable material. The stow stop 82 and electronic control unit 24 are used to turn off the motor 78 of the motor assembly 22. The running board 12 will continue to move towards the stowed position until the running board abuts the stow stop 82. A current spike is generated in the motor assembly 22 as a result of the motor assembly 22 meeting a resistance to movement when the running board 12 hits the stow stop 82. The current spike will be instantaneously detected by the electronic control unit 24. In response to the current spike, the electronic control unit 24 turns off the motor 78. Likewise, the running board 12 will continue to move towards the box side step position until the running board abuts the end stop 80. A current spike is generated in the motor assembly 22 as a result of the motor assembly 22 meeting a resistance to movement when the running board 12 hits the end stop 80. The current spike will be instantaneously detected by the electronic control unit 24. In response to the current spike, the electronic control unit 24 turns off the motor 78.

Figure 22:
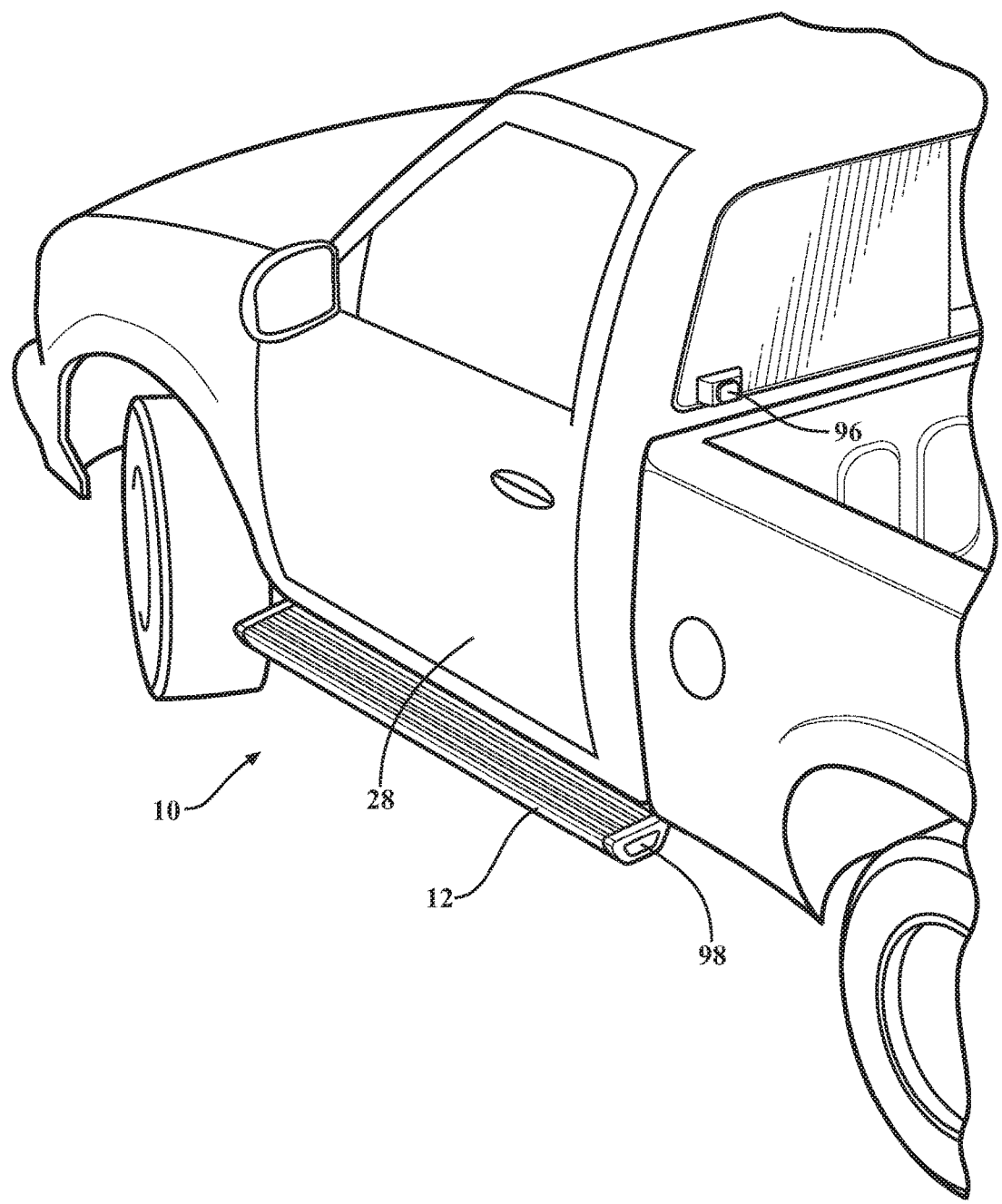
FIG. 22 is a fragmentary rear perspective view of the motor vehicle including an end cap switch and a body-mounted switch for activating movement of the running board into and out of the box side step position.

Referring to FIG. 22, the motor vehicle 28 may include an input member such as a body-mounted switch 96, an end cap switch 98, or a key fob to initiate movement of the running board 12 into and out of the box side step position. The body-mounted switch 96 and the end cap switch 98 may be electrically connected to the electronic control unit 24 by wire members 100 or by a wireless connection. The body-mounted switch 96 is easily accessible by hand and the end cap switch 98 may be accessed by a user's foot. Thus, the running board 12 may be hand-operated, or foot-operated if hands-free operation of the running board 12 is desired. The running board 12 may be moved into the box side step position from either the stowed position or the cab entry position. Upon activation of one of the switches 96, 98 or the key fob, a signal is sent to the electronic control unit 24. The electronic control unit 24 in response to the signal supplies an appropriate voltage to the motor assembly 22 to cause rotational movement in a first direction which will convert rotary input to linear motion and pivot the drive arm 16 linkages to move the running board 12 to the box side step position.

To move the running board 12 out of the box side step position and into the stowed position, the body-mounted switch 96, the end cap switch 98, or the key fob is activated which sends a signal to the electronic control unit 24. The electronic control unit 24 in response to the signal supplies an appropriate voltage to the motor assembly 22 to cause rotational movement in a second rotational direction which will convert rotary input to linear motion and pivot the drive arm 16 linkages to move the running board 12 to the to the stowed position. Specifically, the motor shaft of the motor assembly 22 rotates the lead worm 55 causing rotation of the worm gear 54 in a second rotational direction which in turn rotates the ball screw member 52. The actuator shaft tube 58 rotates with the ball screw member 52 and causes the drive arm 16 to pivot inwardly towards the motor vehicle 28 to move the running board 12 to the stowed position. The running board 12 reaches the stowed position when the running board 12 abuts the stow stop 82 on the drive arm 16. A current spike is generated in the motor assembly 22 as a result of the motor assembly 22 meeting a resistance to movement when the running board 12 hits the stow stop 82. The current spike will be instantaneously detected by the electronic control unit 24. In response to the current spike, the electronic control unit 24 turns off the motor 78. It is further contemplated that in the alternative the running board 12 may be moved from the box side step position to the cab entry position. It is appreciated that in one embodiment the stops for linear actuation are internal without any external stops.

Alternatively, a belt drive, spur gear drive, planetary gear arrangement, or direct drive between armature and lead screw, or any other predetermined arrangement adapted to and suitable for deploying/stowing the running board from any predetermined vehicles depending on the applications.

Alternatively, the running board is movable relative to the housing assembly between a stowed position tucked underneath the motor vehicle and a motor vehicle compartment entry position generally outwardly from the motor vehicle to support a user entering or exiting the passenger cab. Alternatively, the running board is movable relative to the housing assembly between a stowed position tucked underneath the motor vehicle and a plurality of deployed positions. Alternatively, the running board is movable relative to the housing assembly between one stowed position and one deployed position. Alternatively, the running board is movable relative to the housing assembly between at least one stowed position and at least one deployed position.

Figure 23:
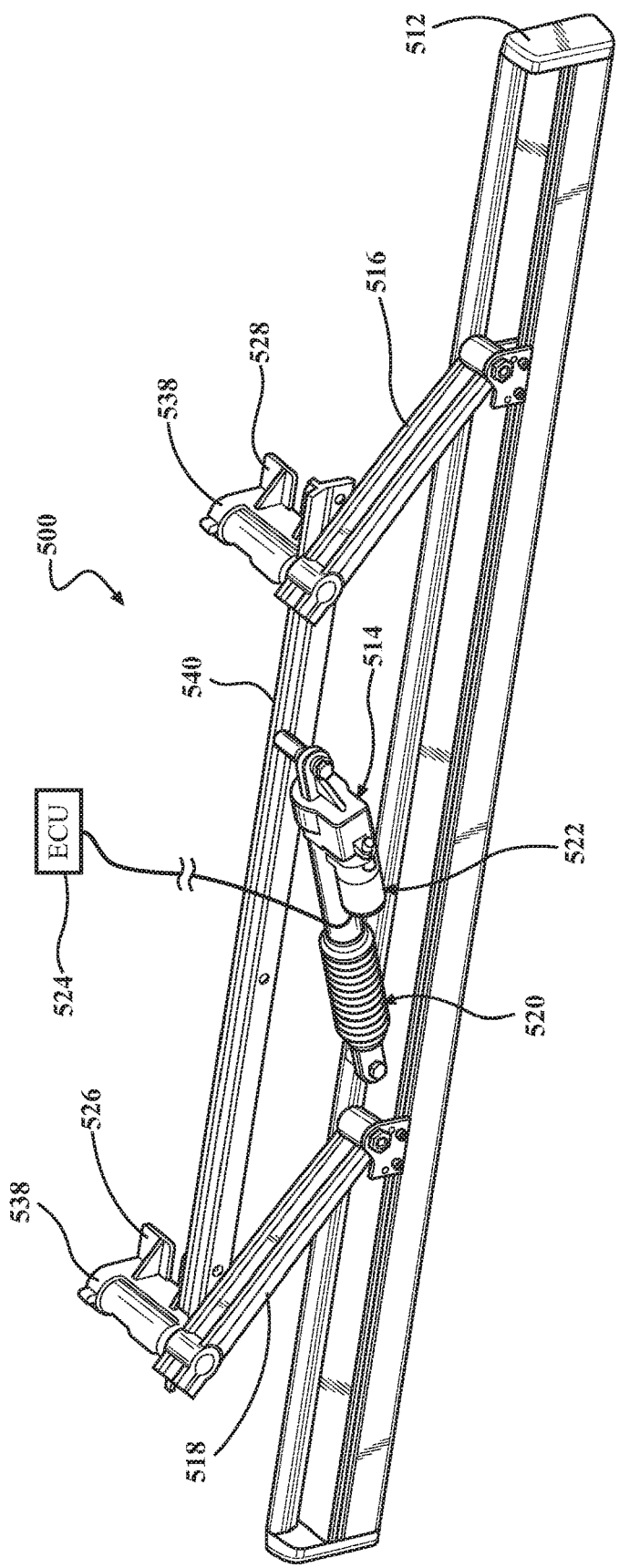
FIG. 23 is a perspective view of a linear actuator assembly connected to the running board, in accordance with another aspect of the present invention.
Figure 24:
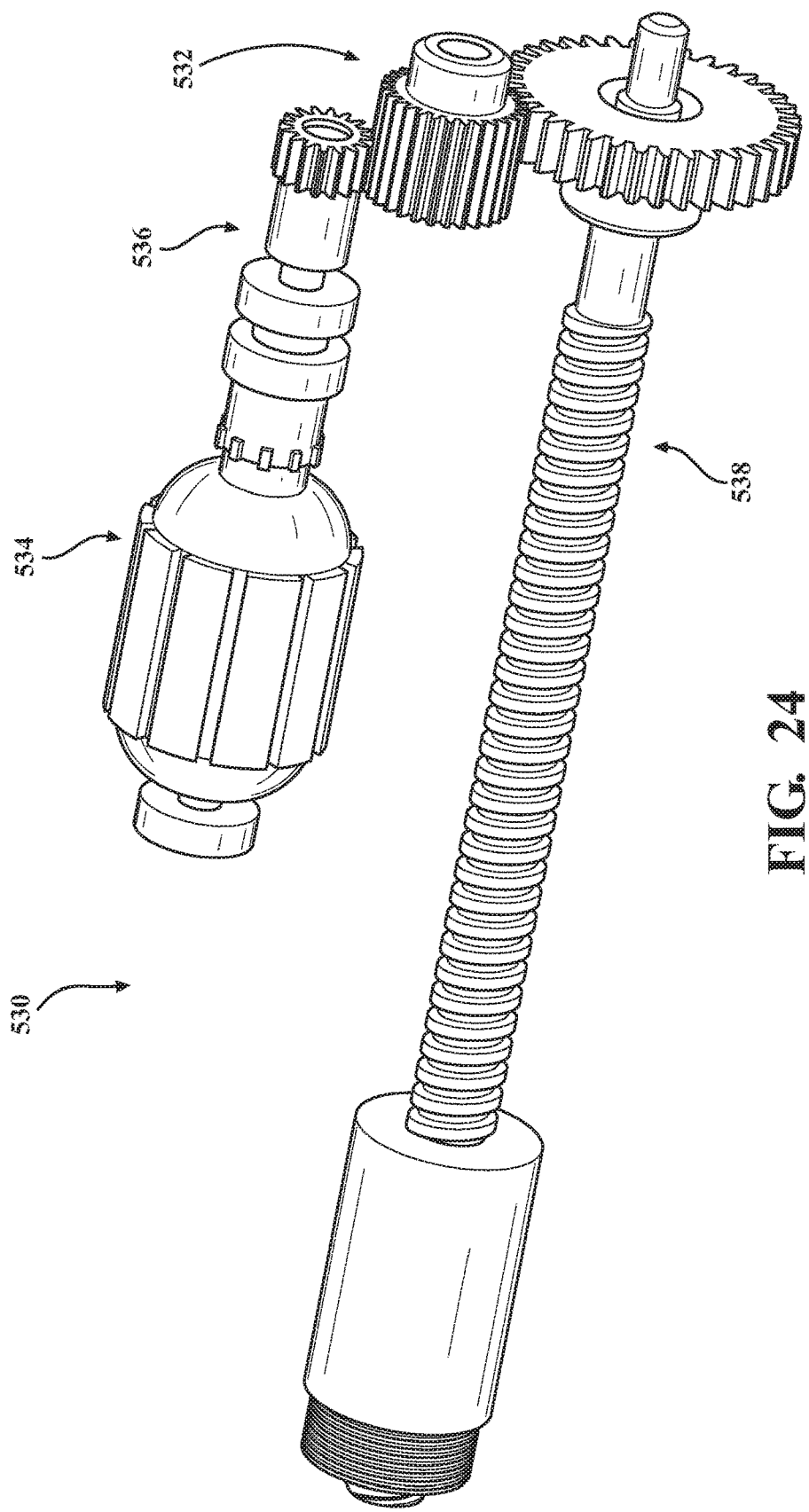
FIG. 24 is a perspective view of a linear actuator assembly with a gear drive arrangement, in accordance with another aspect of the present invention.
Figure 25:
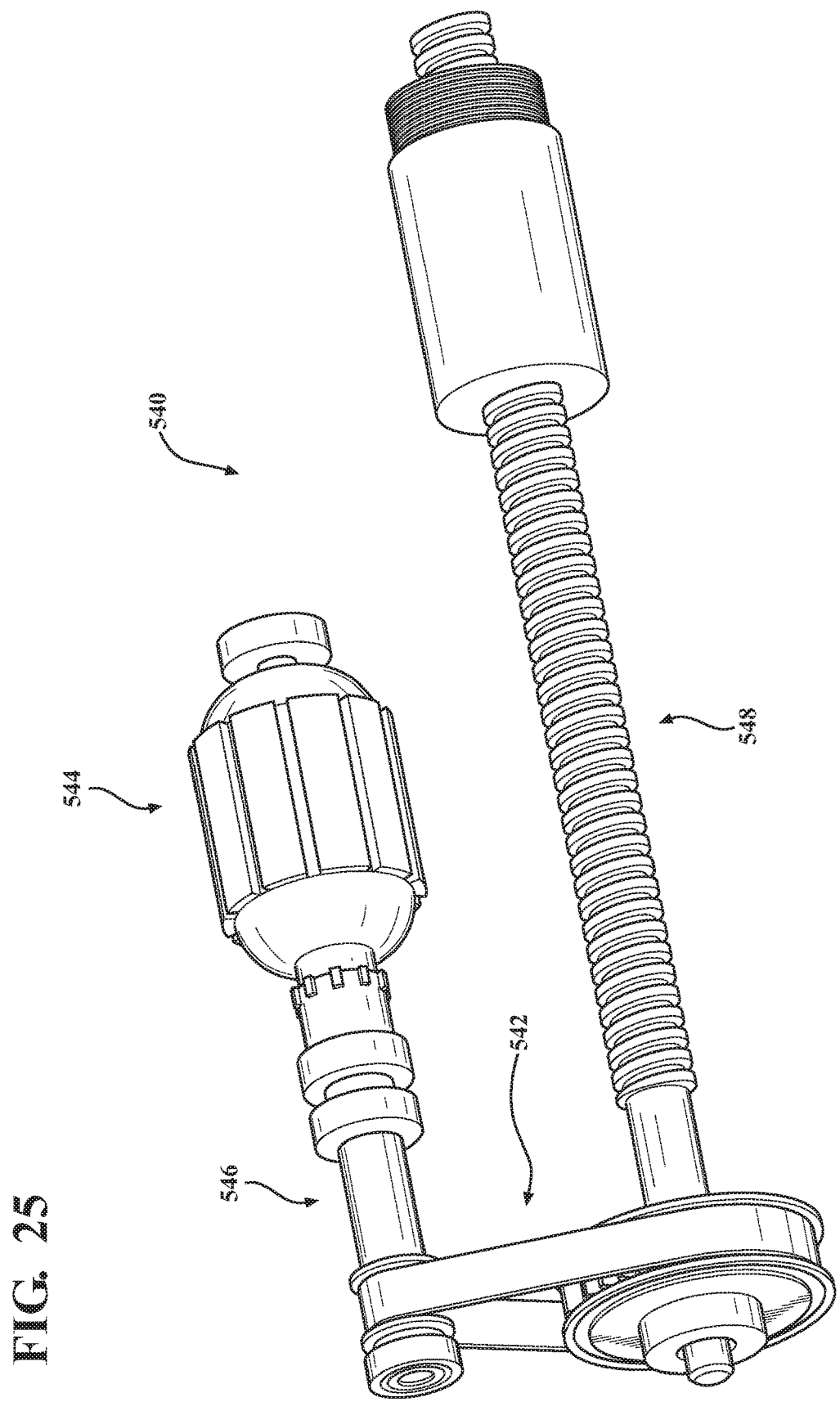
FIG. 25 is a perspective view of a linear actuator assembly with a belt drive arrangement, in accordance with another aspect of the present invention.

Referring now to FIGS. 23-25 generally, where like numbers denote like parts, a power running board assembly, generally shown at 500, in another embodiment includes a running board 512, a housing assembly shown generally at 514, at least one first swing arm 518, at least one second swing arm 116, a linear actuator assembly shown generally at 520, a motor assembly shown generally 522, an electronic control unit 524, and at least two mounting brackets 526, 528. The mounting brackets 526,528 are adapted for attachment to a frame of a motor vehicle 540 or other predetermined vehicle structure. The at least two swing arms 518, 516 are pivotally connected to the running board 512 and pivotally connected to respective hub structures 538,538, forming a linkage. The linear actuator assembly 520 is connected to the running board 512 toward one end of the linear actuator assembly 520. The linear actuator assembly 520 is connected toward the other end to the motor vehicle body, e.g. frame 540. The motor 522 actuates the linear actuator assembly and drives movement of the linear actuator assembly 520, which causes movement of the linear actuator assembly 520 and drives the at least two swing arms 518,516 to pivotally move the running board 512 between the stowed position and any predetermined deployed position(s). Referring more particularly to FIG. 23, the actuator 520 is connected to the step 512 instead of one of the swing arms 518,516.

In one embodiment, the drive arrangement includes a motor armature shaft and lead screw with a worm gear drive. Alternatively, a belt drive, spur gear drive, planetary gear arrangement, or direct drive between armature and lead screw, or any other predetermined arrangement adapted to and suitable for deploying/stowing the running board from any predetermined vehicles depending on the applications.

Referring more particularly to FIG. 24, in one embodiment the actuator is a linear actuator gear drive arrangement, indicated generally at 530, that includes a spur gear design with a plurality of in-meshed gears, shown generally at 532, and a motor assembly, shown generally at 534. The spur gear arrangement 532 is operably positioned between a motor armature shaft, shown generally at 536, and a lead screw, shown generally at 538, e.g., operable to convert rotary movement into linear movement, to drive the running board 512 between predetermined positions.

Referring more particularly to FIG. 25, in one embodiment the linear actuator assembly has a linear actuator belt drive arrangement, indicated generally at 540, that includes a belt drive design with a belt device, shown generally at 542, and a motor assembly, shown generally at 544. The belt drive arrangement 542 is operably positioned between a motor armature shaft, shown generally at 546, and a lead screw, shown generally at 548, e.g., operable to convert rotary movement into linear movement, to drive the running board 512 between predetermined positions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A compact power running board assembly for a motor vehicle, comprising:
   an actuator assembly operably coupled to a swing arm;
   a running board operably connected to said swing arm;
   a housing assembly including an opening;
   a pivot shaft located within said housing assembly, said swing arm extending through said opening of said housing assembly and operably connected to said pivot shaft;
   a pair of bushing bearings coupled to said pivot shaft within said housing assembly, wherein said pair of bushing bearings comprises a first bushing bearing mounted to the pivot shaft at a location below the swing arm attachment and a second bushing bearing mounted to the pivot shaft mounted to the pivot shaft at a location above the swing arm attachment location;
   a motor assembly operably coupled to said actuator assembly for driving said actuator assembly to move said running board between at least one stowed position and at least one deployed position; and
   a thrust bearing coupled to the pivot shaft between said swing arm and said first bushing bearing.

2. The compact power running board assembly of claim 1, further comprising a gap in said housing assembly located between said swing arm and interior walls of said housing assembly.

3. The compact power running board assembly of claim 2, further comprising at least one seal inside said housing assembly operable to prevent moisture that entered said gap from said opening to travel to other areas within said housing assembly other than for allowing said moisture to exit back out through said opening.

4. The compact power running board assembly of claim 3, wherein said at least one seal is an oil seal coupled immediately adjacent to the outside of a thrust bearing that is mounted to said pivot shaft immediately adjacent to a bottom of said swing arm.

5. The compact power running board assembly of claim 4, wherein a second seal is operably coupled immediately adjacent to a top surface of said swing arm.

6. The compact power running board assembly of claim 1, further comprising a mechanical stop connected to said swing arm including at least two stop members, wherein a first stop contacts said running board when in said at least one deployed position to prevent further movement of said running board in a first direction and a second stop contacts said running board when in said stowed position to prevent further movement of said running board in a second direction.

7. The compact power running board assembly of claim 6, further comprising an over current sensor operably coupled to said motor assembly that detects current spikes caused by said running board contacting an obstruction or contact with said first or second stops, wherein the current spike causes an electronic control unit to turn said motor assembly off.

8. The compact power running board assembly of claim 6, wherein said mechanical stop includes an L-shaped mounting bracket with a first half including a first bumper that contacts a rear surface of said running board when in the deployed position and a second half including a second bumper that contacts said rear surface of said running board when in the stowed position.

9. The compact power running board assembly of claim 1, further comprising a key member operably coupled to the pivot shaft and keyed to the swing arm to cause said swing arm to pivot with rotation of the pivot shaft operably driven by the actuator assembly.

10. The compact power running board assembly of claim 1, wherein said actuator assembly is a rotary actuator comprising a worm gear operably coupled to said motor assembly and in operable meshing engagement with a worm wheel including a hub, wherein said hub is keyed to said pivot shaft, and wherein said motor assembly selectively drives rotation of said worm gear in a first or second direction which drives rotation of said worm wheel to rotate said pivot shaft to pivot said swing arm between said stowed and deployed positions.

11. The compact power running board assembly of claim 10, further comprising at least one O-ring mounted to said pivot shaft immediately adjacent to said worm wheel to prevent moisture from entering the worm gear.

12. The compact power running board assembly of claim 1, wherein the actuator assembly is selected from the group consisting of rotary actuator, linear actuator, pneumatic actuator, hydraulic actuator, ball screw/nut linear actuator, gear driven linear actuator, and belt driven linear actuator.

13. The compact power running board assembly of claim 1, wherein said housing assembly further comprises an inboard mounting bracket member and an outboard mounting bracket member for attaching to said motor vehicle.

14. The compact power running board assembly of claim 1, further comprising an idler swing arm mechanism including a second swing arm connected to said running board and connected inside of an idler housing assembly, wherein said swing arm and said second swing arm form a parallel linkage to move said running board between said at least one stowed position and said at least one deployed position when said swing arm is driven to rotate by said actuator assembly.

15. The compact power running board assembly of claim 14, wherein said idler swing arm mechanism further includes a pivot shaft located within said idler housing assembly, said second swing arm extending through an opening of said idler housing assembly and operably connected to said pivot shaft.

16. The compact power running board assembly of claim 15, wherein said idler swing arm mechanism further includes a first bushing bearing mounted to said pivot shaft at a location below said second swing arm within said idler housing and a second bushing bearing mounted to said pivot shaft at a location above said second swing arm within said idler housing.

17. The compact power running board assembly of claim 14, wherein said idler swing arm mechanism further includes at least two thrust bearings mounted to said pivot shaft, one on each side of said second swing arm, to transfer force to said first and second bushing bearings.

18. The compact power running board assembly of claim 17, further comprising at least two oil seals mounted on the outside of said at least two thrust bearings, respectively, to seal against moisture within the idler housing assembly.

19. The compact power running board assembly of claim 14, wherein said idler housing assembly further comprises an inboard mounting bracket member and an outboard mounting bracket member for attaching to said motor vehicle.

20. A compact power running board assembly for a sport utility vehicle, comprising:
   an actuator assembly operably coupled to a swing arm of a linkage;
   a running board operably connected to said linkage;
   a housing assembly including an opening;
   a pivot shaft within said housing assembly, said swing arm extending through said opening of said housing assembly and operably mounted to said pivot shaft;
   a motor assembly operably coupled to said actuator assembly for driving said actuator assembly to move said running board between at least one stowed position and at least one deployed position;
   a first bushing bearing coupled to said pivot shaft within said housing assembly at a location below said swing arm; and
   a second bushing bearing coupled to said pivot shaft within said housing assembly at a location above said swing arm;
   at least one thrust bearing immediately adjacent to said swing arm to transfer force from said swing arm to said first bushing bearing;
   wherein said swing arm located between and a predetermined distance from said first and second bushings within said housing assembly provides a compact arrangement and reduces reaction forces within the housing assembly by at least half.

21. A compact power running board assembly for a motor vehicle, comprising:
   an actuator assembly operably coupled to a swing arm;
   a running board operably connected to said swing arm;
   a housing assembly including an opening;
   a pivot shaft located within said housing assembly, said swing arm extending through said opening of said housing assembly and operably connected to said pivot shaft;
   a pair of bushing bearings coupled to said pivot shaft within said housing assembly;
   a motor assembly operably coupled to said actuator assembly for driving said actuator assembly to move said running board between at least one stowed position and at least one deployed position;
   a gap in said housing assembly located between said swing arm and interior walls of said housing assembly; and
   at least one seal inside said housing assembly operable to prevent moisture that entered said gap from said opening to travel to other areas within said housing assembly other than for allowing said moisture to exit back out through said opening, wherein said at least one seal is an oil seal coupled immediately adjacent to the outside of a thrust bearing that is mounted to said pivot shaft immediately adjacent to a bottom of said swing arm.

22. A compact power running board assembly for a motor vehicle, comprising:
   an actuator assembly operably coupled to a swing arm;
   a running board operably connected to said swing arm;
   a housing assembly including an opening;
   a pivot shaft located within said housing assembly, said swing arm extending through said opening of said housing assembly and operably connected to said pivot shaft;
   a pair of bushing bearings coupled to said pivot shaft within said housing assembly;
   a motor assembly operably coupled to said actuator assembly for driving said actuator assembly to move said running board between at least one stowed position and at least one deployed position;
   a mechanical stop connected to said swing arm including at least two stop members, wherein a first stop contacts said running board when in said at least one deployed position to prevent further movement of said running board in a first direction and a second stop contacts said running board when in said stowed position to prevent further movement of said running board in a second direction; and
   wherein said mechanical stop includes an L-shaped mounting bracket with a first half including a first bumper that contacts a rear surface of said running board when in the deployed position and a second half including a second bumper that contacts said rear surface of said running board when in the stowed position.

23. A compact power running board assembly for a motor vehicle, comprising:
- an actuator assembly operably coupled to a swing arm;
- a running board operably connected to said swing arm;
- a housing assembly including an opening;
- a pivot shaft located within said housing assembly, said swing arm extending through said opening of said housing assembly and operably connected to said pivot shaft;
- a pair of bushing bearings coupled to said pivot shaft within said housing assembly;
- a motor assembly operably coupled to said actuator assembly for driving said actuator assembly to move said running board between at least one stowed position and at least one deployed position;
- an idler swing arm mechanism including a second swing arm connected to said running board and connected inside of an idler housing assembly, wherein said swing arm and said second swing arm form a parallel linkage to move said running board between said at least one stowed position and said at least one deployed position when said swing arm is driven to rotate by said actuator assembly; and
- wherein said idler swing arm mechanism further includes at least two thrust bearings mounted to said pivot shaft, one on each side of said second swing arm, to transfer force to said first and second bushing bearings.

* * * * *